US012223632B2

(12) United States Patent
 Zhang et al.

(10) Patent No.: US 12,223,632 B2
(45) Date of Patent: Feb. 11, 2025

(54) INTELLIGENT DETECTION METHOD AND UNMANNED SURFACE VEHICLE FOR MULTIPLE TYPE FAULTS OF NEAR-WATER BRIDGES

(71) Applicant: SOUTHEAST UNIVERSITY, Nanjing (CN)

(72) Inventors: Jian Zhang, Nanjing (CN); Zhili He, Nanjing (CN); Shang Jiang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 17/755,086

(22) PCT Filed: May 8, 2021

(86) PCT No.: PCT/CN2021/092393
§ 371 (c)(1),
(2) Date: Apr. 21, 2022

(87) PCT Pub. No.: WO2022/193420
PCT Pub. Date: Sep. 22, 2022

(65) Prior Publication Data
US 2023/0351573 A1 Nov. 2, 2023

(30) Foreign Application Priority Data
Mar. 17, 2021 (CN) .......................... 202110285996.5

(51) Int. Cl.
*G06T 7/00* (2017.01)
*B63B 1/12* (2006.01)
(Continued)

(52) U.S. Cl.
CPC ............ *G06T 7/0002* (2013.01); *B63B 1/125* (2013.01); *B63B 35/00* (2013.01); *B63B 45/04* (2013.01);
(Continued)

(58) Field of Classification Search
None
See application file for complete search history.

(56) References Cited

U.S. PATENT DOCUMENTS 10,354,169 B1 * 7/2019 Law ...................... G06F 18/214
10,719,641 B2 * 7/2020 Morczinek .............. G06F 30/13
(Continued)

FOREIGN PATENT DOCUMENTS

CN        107839845        3/2018
CN        108288269        7/2018
(Continued)

OTHER PUBLICATIONS

Fu, Jun Dual Attention Network for Scene Segmentation arXiv: 1809.02983v4 Apr. 21, 2019.

*Primary Examiner* — Peter J Macchiarolo
*Assistant Examiner* — Jermaine L Jenkins
(74) *Attorney, Agent, or Firm* — Treasure IP Group, LLC

(57) ABSTRACT

The invention discloses an intelligent detection method for multiple types of faults for near-water bridges and an unmanned surface vehicle. The method includes an infrastructure fault target detection network CenWholeNet and a bionics-based parallel attention module PAM. CenWholeNet is a deep learning-based Anchor-free target detection network, which mainly comprises a primary network and a detector, used to automatically detect faults in acquired images with high precision. Wherein, the PAM introduces an attention mechanism into the neural network, including spatial attention and channel attention, which is used to
(Continued)

enhance the expressive power of the neural network. The unmanned surface vehicle includes hull module, video acquisition module, lidar navigation module and ground station module, which supports lidar navigation without GPS information, long-range real-time video transmission and highly robust real-time control, used for automated acquisition of information from bridge underside.

6 Claims, 12 Drawing Sheets

(51) Int. Cl.
  *B63B 35/00* (2020.01)
  *B63B 45/04* (2006.01)
  *B63B 79/40* (2020.01)
  *G01M 5/00* (2006.01)
  *G06T 7/73* (2017.01)
  *H04N 23/56* (2023.01)

(52) U.S. Cl.
  CPC ......... *B63B 79/40* (2020.01); *G01M 5/0008* (2013.01); *G01M 5/0075* (2013.01); *G01M 5/0091* (2013.01); *G06T 7/73* (2017.01); *B63B 2035/008* (2013.01); *B63B 2211/02* (2013.01); *G06T 2207/10016* (2013.01); *G06T 2207/10024* (2013.01); *G06T 2207/20081* (2013.01); *G06T 2207/20084* (2013.01); *G06T 2207/30184* (2013.01); *G06T 2207/30252* (2013.01); *H04N 23/56* (2023.01)

(56) References Cited

U.S. PATENT DOCUMENTS

| 11,521,357 | B1* | 12/2022 | Côté | G06T 17/00 |
| 11,769,052 | B2* | 9/2023 | Kwon | G06V 20/56 |
| 2020/0043229 | A1* | 2/2020 | Jin | G08G 5/0013 |
| 2024/0020953 | A1* | 1/2024 | Park | G06V 10/82 |

FOREIGN PATENT DOCUMENTS

| CN | 109300126 | 2/2019 |
| CN | 109978847 | 7/2019 |
| CN | 111021244 | 4/2020 |
| CN | 111062437 | 4/2020 |
| CN | 111127399 | 5/2020 |
| CN | 111260615 | 6/2020 |
| CN | 111310558 | 6/2020 |
| CN | 111413353 | 7/2020 |
| CN | 111651916 | 9/2020 |
| CN | 111862112 | 10/2020 |
| CN | 112171692 | 1/2021 |
| CN | 112465748 | 3/2021 |
| CN | 112488990 | 3/2021 |

* cited by examiner

| description | Primary network | AP % 50-95 | AP_50 % | AP_75 % | AR_100 % | Parameters (M) | FPS |
|---|---|---|---|---|---|---|---|
| Anchor-based: | | | | | | | |
| Faster R-CNN (Two-stage) | ResNet-18 | 42.1 | 59.0 | 51.4 | 44.3 | 12.62 | 6 |
| YOLO v5s (One-stage) † | depth:0.33, width:0.50 | 24.2 | 49.1 | / | / | 7.26 | 27 |
| YOLO v5m (One-stage) † | depth:0.67, width:0.75 | 31.0 | 52.1 | / | / | 21.49 | 25 |
| YOLO v5l (One-stage) † | depth:1.00, width:1.00 | 32.8 | 55.9 | / | / | 47.40 | 23 |
| YOLO v5x (One-stage) † | depth:1.33, width:1.25 | 33.0 | 58.5 | / | / | 88.45 | 20 |
| YOLO v5x (One-stage) ‡ | depth:1.33, width:1.25 | 40.7 | 70.4 | / | / | 88.45 | 20 |
| Anchor-free one-stage: | | | | | | | |
| CenterNet | ResNet-18 | 39.8 | 64.5 | 43.9 | 52.3 | 15.82 | 18 |
| CenterNet + SE | ResNet-18 | 41.4 | 65.7 | 46.7 | 55.8 | 15.90 | 17 |
| CenterNet + CBAM | ResNet-18 | 40.5 | 73.6 | 38.2 | 51.4 | 15.90 | 15 |
| CenterNet + PAM | ResNet-18 | 46.8 | 73.1 | 53.3 | 55.1 | 15.94 | 15 |
| CenWholeNet | ResNet-18 | 46.0 | 75.3 | 51.9 | 56.2 | 15.96 | 18 |
| CenWholeNet + PAM | ResNet-18 | 49.0 | 75.4 | 56.6 | 58.7 | 16.08 | 15 |
| Change to other primary networks | | | | | | | |
| Faster R-CNN (Two-stage) | ResNet-34 | 52.3 | 80.5 | 61.8 | 57.3 | 22.73 | 5 |
| CenterNet | Hourglass-52 | 52.1 | 88.2 | 53.6 | 60.3 | 95.43 | 12 |
| CenWholeNet | Hourglass-52 | 55.2 | 86.0 | 54.9 | 65.9 | 96.03 | 12 |
| CenWholeNet + PAM | Hourglass-52 | 59.2 | 89.3 | 62.1 | 67.3 | 96.20 | 10 |

Notes: "†" indicates Epochs for training is 20. "‡" indicates Epochs for training is 30.

Figure 11

INTELLIGENT DETECTION METHOD AND UNMANNED SURFACE VEHICLE FOR MULTIPLE TYPE FAULTS OF NEAR-WATER BRIDGES

CROSS-REFERENCE TO RELATED APPLICATIONS

This Application is a Section 371 National Stage Application No. PCT/CN2021/092393, filed on May 8, 2021, and claims priority to Chinese Patent Application No. 202110285996.5, filed on Mar. 7, 2021, the contents of which are incorporated herein by reference in their entireties.

TECHNICAL FIELD

The invention belongs to the field of structural fault detection in civil engineering, and in particular relates to an intelligent detection method for multi-type faults of a near-water bridge and an unmanned surface vehicle.

BACKGROUND

During the service lifetime of engineering structures, due to the influence of load and environment, many faults will occur. Once these faults are generated, they will easily accumulate and expand, thus affecting the service life and overall safety of the structure, and even affecting the safety of people's lives and their properties. In recent years, there have been many cases of structural damage such as bridge collapse due to lack of effective inspection and maintenance. Therefore, regular inspection and maintenance of the structure is essential.

Traditional infrastructure fault detection methods are mainly manual. These methods require the help of complicated tools, and have problems such as low efficiency, high labor costs, and large detection blind spots. Therefore, many researchers have recently introduced intelligent detection methods and intelligent detection equipment into the field of infrastructure fault detection. The intelligent detection method is represented by deep learning technology, which has brought revolutionary solutions to many industries, such as medicine and health, aerospace and material science. For example, the patent document with the publication number CN111862112A discloses a learned medical image segmentation method, the patent document with the publication number CN111651916A, discloses a material property prediction method based on deep learning. Similarly, the use of deep learning techniques for intelligence of structural faults is attracting more and more attention. Researchers apply deep learning methods to the detection of different faults and different infrastructures. Such as concrete structure crack detection, reinforced concrete structure multi-fault detection, steel structure corrosion detection, bolt loosening detection, ancient building fault detection, shield tunnel defect detection, etc. However, intelligent algorithms are not enough. To achieve true automatic detection, intelligent detection equipment is also required. In order to meet the needs of different inspection projects, a variety of inspection robots have been proposed and applied. Such as bridge inspection drones, mobile tunnel inspection vehicles, bridge deck inspection robots, rope climbing robots, etc. For example, the patent document with the publication number CN112171692A discloses a flying adsorption robot suitable for intelligent detection of bridge deflection; the patent document with the publication number CN111413353A discloses an intelligent mobile comprehensive detection equipment for tunnel lining faults; patent document with the publication number CN111021244A discloses an orthotropic steel bridge deck fatigue crack detection robot; the patent document with the publication number CN109978847A discloses a cable-robot-based method for identifying the fault of the noose.

These methods have solved many engineering problems, but two outstanding shortcomings of the current solutions remains. (1) The current intelligent detection method is mainly based on the Anchor-based method, that is, a large number of a priori boxes need to be pre-set, that is, anchor boxes, so it is named Anchor-based method. For example, the patent document with the publication number CN111062437A discloses a bridge fault target detection model based on the Faster R-CNN model, and the patent document with the publication number CN111310558A also discloses a road damage extraction method based on the Faster R-CNN model. The patent document with the publication number CN111127399A, discloses a method for detecting bridge pier faults based on the YOLOv3 model. Both the Faster R-CNN model and the YOLO series models are very classic Anchor-based methods. The first prominent problem of Anchor-based methods is that the effect of the algorithm will be affected by the pre-set prior box. When dealing with features with complex shapes, having multiple aspect ratios and multiple sizes, the size and aspect ratio of the prior box may be too different from the target, which will reduce the recall rate of the prediction results. Therefore, in order to improve the detection accuracy, a large number of prior frames are often preset. This also brings about the second prominent problem of the Anchor-based method. A large number of a priori boxes will introduce a large number of hyperparameters and design choices, which will make the model very complex, and the computational load is large, and the computational efficiency is often not high. Therefore, traditional intelligent detection methods are not suitable for structural fault detection, and the engineering community urgently needs new intelligent detection algorithms that are more efficient and concise, and have a wider adaptability. (2) At present, where an intelligent equipment can detect fault is still very limited, and it is mainly facing the area that is easy to detect such as the outer surface of the structure. The detection method, the patent document with the publication number of CN111260615A, discloses a method for detecting apparent faults of bridges based on UAV. However, the UAV system is difficult to work in relatively closed spaces, such as the bottom area of a large number of small and medium bridges, where the headroom is low, and the situation is complex, and artificial and intelligent detection equipment is often helpless. Taking UAV as an example, its flight often requires a wider space free of interference, and GPS signal-assisted positioning and manipulation. However, the GPS signal in the bottom area of small and medium-sized bridges with very low clearance is often very weak, and the internal situation is also very complicated. There are risks such as signal loss and collision damage when drones fly in. And some areas are very small, there may be toxic gases, and it is difficult for humans to easily reach them. Therefore, these areas have become detection blind spots for many years. Effective detection of these areas is also the focus and difficulty of the project. The engineering community urgently needs new types of intelligent detection equipment to detect such areas that are difficult for humans and other intelligent equipment to detect.

SUMMARY OF THE INVENTION

In order to solve the above problems, the present invention discloses an intelligent detection method and unmanned surface vehicle for multi-type faults of near-water bridges, which are suitable for automatic and intelligent detection of faults at the bottom of small and medium bridges. The proposed solution includes intelligent algorithms and hardware equipment. It can ensure the detection accuracy while taking into account the detection speed, and has a wide adaptability and applicability to complex engineering environments.

For achieving the above object, technical scheme of the present invention is as follows.

An intelligent detection system for detecting multiple types of faults for near-water bridges, comprises a first component, a second component, and a third component. The first component is an intelligent detection algorithm: CenWholeNet, an infrastructure fault target detection network based on deep learning.

The second component is an embedded parallel attention module PAM into the target detection network CenWholeNet, and the parallel attention module includes two sub-modules: a spatial attention sub-module and a channel attention sub-module.

The third component is an intelligent detection equipment assembly: an unmanned surface vehicle system based on lidar navigation, the unmanned surface vehicle includes four modules, a hull module, a video acquisition module, a lidar navigation module and a ground station module.

Further, the infrastructure fault target detection network CenWholeNet described in the first component comprises the following steps:

Step 1: a primary network: using the primary network to extract features of images;

Step 2: a detector: converting the extracted image features, by the detector, into tensor forms required for calculation, and optimizes a result through a loss function; and Step 3: result output: the result output includes converting the tensor into a boundary box and outputting of prediction results of target detection.

Wherein Step 1 of the infrastructure fault target detection network CenWholeNet in the first component has the primary network, the method of using the primary network is as follows: giving an input image $P \in \mathbb{R}^{W \times H \times 3}$, wherein W is the width of the image, H is the height of the image, and 3 represents the number of channels of the image, that is, three RGB channels; extracting features of the input image P through the primary network;

using two convolutional neural network models, Hourglass network and deep residual network ResNet.

Wherein Step 2 of the infrastructure fault target detection network CenWholeNet in the first component has the detector, the method of using the detector is as follows:

converting the features extracted by the primary network into an output set consisting of 4 tensors $\widetilde{S} = [\tilde{H}, \tilde{D}, \tilde{O}, \widetilde{Polar}]$, by the detector, as a core of CenWholeNet;

using $$\tilde{H} \in [0,1]^{C \times \frac{W}{r} \times \frac{H}{r}}$$

represent a heat map of a central key point, where C is a category of the fault, which is taken as C=3 here, and r is an output step size, that is, the down sampling ratio, wherein a default step size is 4 and by down sampling, the calculation efficiency is improved;

defining $$\tilde{H} \in [0,1]^{C \times \frac{W}{r} \times \frac{H}{r}}$$

as ground-truth heatmap, for category c, the ground-truth center point of location (i, j) is $p_{cij} \in \mathbb{R}^{C \times W \times H}$; First computing its down sampled equivalent position $$\hat{p}_{cxy} \in \mathbb{R}^{C \times \frac{W}{r} \times \frac{H}{r}},$$

wherein $$x = \left\lfloor \frac{i}{r} \right\rfloor,$$

$$y = \left\lfloor \frac{j}{r} \right\rfloor;$$

then through a Gaussian kernel function, map $$\hat{p}_{cxy} \in \mathbb{R}^{C \times \frac{W}{r} \times \frac{H}{r}}$$

to tensor $$Y_p \in \mathbb{R}^{C \times \frac{W}{r} \times \frac{H}{r}},$$

$Y_p$ is defined by:

$$Y_p(c, x, y) = \exp\left(-\frac{(x - \hat{p}_{cxy}(x))^2 + (y - \hat{p}_{cxy}(y))^2}{2\sigma_p^2}\right)$$

wherein $\hat{p}_{cxy}(x)$ and $\hat{p}_{cxy}(y)$ represent center point position (x,y), $\sigma_p$=gaussian_radius/3; and gaussian_radius represent a maximum radius representing an offset of the corner points of a detection frame, wherein the maximum radius ensures that the intersection ratio between the offset detection frame and the ground-truth detection frame is IoU≥t, and t=0.7 is taken in all experiments; integrating all the corresponding $Y_p$ points to get the ground-truth heat map H:

$$H_{c,x,y} = \max_p [Y_p(c, x, y)], c \in [1, C], x \in \left[1, \frac{W}{r}\right], y \in \left[1, \frac{H}{r}\right]$$

wherein, $H_{c,x,y}$ represents a value of H at the position (c,x,y), a probability that this position is a center point; specifically, $H_{c,x,y}=1$ represents a central key point, a positive sample; conversely, $H_{c,x,y}=0$ is a background and the negative sample; focal loss as a metric to measure a distance between $\tilde{H}$ and H, according to the following equation:

$$\mathcal{L}_{Heat} = -\frac{1}{N}\sum_{c=1}^{C}\sum_{x=1}^{W/r}\sum_{y=1}^{H/r}\begin{cases}(1-\tilde{H}_{c,x,y})^{\alpha}\log(\tilde{H}_{c,x,y}) & \text{if } H_{c,x,y}=1\\(\tilde{H}_{c,x,y})^{\alpha}\log(1-\tilde{H}_{c,x,y})\\(1-H_{c,x,y})^{\beta} & \text{Otherwise}\end{cases}$$

wherein N is a total count of all central key points, α and β are hyperparameters, configured to control the weights; in all cases, α=2, β=4; by minimizing $\mathcal{L}_{Heat}$, the neural network model is configured to better predict a position of a center point of the target;

obtaining a size information W×H of a prediction box to finally determine the boundary box;

defining a size of the ground-truth boundary box corresponding to the $k^{th}$ key point $p_k$ be $d_k=(w_k,h_k)$, and integrate all $d_k$ to get the ground-truth boundary box dimension tensor $$D \in \mathbb{R}^{2\times\frac{W}{r}\times\frac{H}{r}}:$$

$$D = d_1 \oplus d_2 \oplus \ldots \oplus d_N$$

wherein ⊕ represents pixel-level addition; for all fault categories, the model is configured to give a predicted dimension tensor $$\tilde{D} \in \mathbb{R}^{2\times\frac{W}{r}\times\frac{H}{r}},$$

and L1 Loss is configured to measure D and $\tilde{D}$ similarity, determined by the following equation:

$$\mathcal{L}_D =$$

$$\frac{1}{N}\sum_{k=1}^{N}SmoothL1Loss(\tilde{d}_k, d_k) = \frac{1}{N}\sum_{k=1}^{N}\begin{cases}0.5\|\tilde{d}_k - d_k\|_2^2 & \text{if } \|\tilde{d}_k - d_k\|_1 < 1\\\|\tilde{d}_k - d_k\|_1 - 0.5 & \text{Otherwise}\end{cases}$$

obtaining a rough width and height of each prediction box by minimizing $\mathcal{L}_D$, by the model;

correcting an error caused by down sampling by introducing a position offset, because the image is scaled by r times; recording the coordinates of the $k^{th}$ key point $p_k$ as $(x_k,y_k)$, then the mapped coordinates are $(\lfloor x_k/r \rfloor, \lfloor y_k/r \rfloor)$, then get the ground-truth offset:

$$o_k = \left(\frac{x_k}{r} - \left\lfloor\frac{x_k}{r}\right\rfloor, \frac{y_k}{r} - \left\lfloor\frac{y_k}{r}\right\rfloor\right)$$

integrating all $o_k$ to get the ground-truth offset matrix $$O \in \mathbb{R}^{2\times\frac{W}{r}\times\frac{H}{r}}:$$

$$O = o_1 \oplus o_2 \oplus \ldots \oplus o_N$$

wherein, the 2 of a first dimension represents the offset of the key point (x, y) in the W and H directions; correspondingly, the model will give a prediction tensor $$\tilde{O} \in \mathbb{R}^{2\times\frac{W}{r}\times\frac{H}{r}},$$

and smooth L1 Loss is used to train the offset loss:

$$\mathcal{L}_{Off} =$$

$$\frac{1}{N}\sum_{k=1}^{N}SmoothL1Loss(\tilde{o}_k, o_k) = \frac{1}{N}\sum_{k=1}^{N}\begin{cases}0.5\|\tilde{o}_k - o_k\|_2^2 & \text{if } \|\tilde{o}_k - o_k\|_1 < 1\\\|\tilde{o}_k - o_k\|_1 - 0.5 & \text{Otherwise}\end{cases}$$

introducing a new set of tensors to modify the prediction frame and improve the detection accuracy, in order to make the model pay more attention to the overall information of the target; specifically, taking an angle between the connecting line of a diagonal point of the detection frame and the x-axis, and the diagonal length of the detection frame as the training targets; defining coordinates of an upper left corner and lower right corner of the detection frame to be $(x_k^1, y_k^1)$ and $(x_k^2, y_k^2)$, so the diagonal length of the detection frame $l_k$ is calculated as:

$$l_k = \sqrt{(x_k^1 - x_k^2)^2 + (y_k^1 - y_k^2)^2}$$

an inclination of a connecting line between the upper left and lower right corners $\theta_k$ is calculated by the following formula:

$$\theta_k = \pi - \arctan\left(\frac{y_k^2 - y_k^1}{x_k^2 - x_k^1}\right)$$

constructing a pair of complementary polar coordinates polar $$polar_k = \left(\frac{1}{2}l_k, \theta_k\right)$$

and further to obtain a ground-truth polar coordinate matrix $$Polar \in \mathbb{R}^{2\times\frac{W}{r}\times\frac{H}{r}}:$$

$$Polar = \left(\frac{1}{2}l_1, \theta_1\right) \oplus \left(\frac{1}{2}l_2, \theta_2\right) \oplus \ldots \oplus \left(\frac{1}{2}l_N, \theta_N\right)$$

the model also gives a prediction tensor $$\widetilde{Polar} \in \mathbb{R}^{2\times\frac{W}{r}\times\frac{H}{r}};$$

Polar an $\widetilde{Polar}$ is trained by a same L1 loss:

$$\mathcal{L}_{Polar} = \frac{1}{N}\sum_{k=1}^{N}\|\widetilde{polar}_k - polar_k\|_1$$

Finally, for each position, the model will predict the output of C+6, which will form the set $\tilde{S}=[\tilde{H},\tilde{D},\tilde{O},\widetilde{Polar}]$, which will also share the weights of the network; and the loss function of is defined by:

$$\mathcal{L}=\mathcal{L}_{Heat}+\lambda_{Off}\mathcal{L}_{Off}+\lambda_D\mathcal{L}_D+\lambda_{Polar}\mathcal{L}_{Polar}$$

Wherein all the experiments, $\lambda_{off}=10$, $\lambda_D$ and $\lambda_{Polar}$ are both take as 0.1.

In Step 3 of the infrastructure fault target detection network CenWholeNet in the first component, the method of outputting a result is as follows:

outputting results by extracting a possible center keypoint coordinates from a predicted heatmap tensor $\tilde{H}$, and then obtaining a predicted bounding box according to the information in the corresponding $\tilde{D}$, $\tilde{O}$ and $\widetilde{Polar}$; wherein the greater the value of $\tilde{H}_{c,x,y}$, the more likely it is the center point; for category c, if the point $p_{cxy}$ satisfies the following formula, it is considered that $p_{cxy}$ is an candidate center point;

$$\tilde{H}_{c,x,y} = \max_{i^2 \leq 1, j^2 \leq 1, i,j, \in \mathbb{Z}} [\tilde{H}_{c,x+i,y+j}]$$

wherein we do not need non-maximum suppression (NMS), using a 3×3 max-pooling convolutional layer to extract candidate center points; letting a set of center points be $\tilde{P}=\{(\tilde{x}_k,\tilde{y}_k)\}_{k=1}^{N_p}$, wherein $N_p$ is a total number of selected center points; for any center points $(\tilde{x}_k,\tilde{y}_k)$, extract corresponding size information $(\tilde{w}_k,\tilde{h}_k)=(\tilde{D}_{1,\tilde{x}_k,\tilde{y}_k},\tilde{D}_{2,\tilde{x}_k,\tilde{y}_k})$, offset information $(\delta\tilde{x}_k,\delta\tilde{y}_k)=(\tilde{O}_{1,\tilde{x}_k,\tilde{y}_k},\tilde{O}_{2,\tilde{x}_k,\tilde{y}_k})$ and polar coordinate information $(\tilde{l}_k,\tilde{\theta}_k)=(\widetilde{Polar}_{1,\tilde{x}_k,\tilde{y}_k},\widetilde{Polar}_{2,\tilde{x}_k,\tilde{y}_k})$; first, calculate the prediction frame size correction value according to $(\tilde{l}_k,\tilde{\theta}_k)$:

$$\begin{cases} \Delta\tilde{h}_k = \tilde{l}_k\sin(\tilde{\theta}_k) \\ \Delta\tilde{w}_k = -\tilde{l}_k\cos(\tilde{\theta}_k) \end{cases}$$

defining specific location of the prediction box as $$\begin{cases} Top = \tilde{y}_k + \delta\tilde{y}_k - & Bottom = \tilde{y}_k + \delta\tilde{y}_k + \\ \left(\alpha_y \cdot \frac{1}{2}\tilde{h}_k + \beta_y \cdot \Delta\tilde{h}_k\right); & \left(\alpha_y \cdot \frac{1}{2}\tilde{h}_k + \beta_y \cdot \Delta\tilde{h}_k\right) \\ Left = \tilde{x}_k + \delta\tilde{x}_k - & Right = \tilde{x}_k + \delta\tilde{x}_k + \\ \left(\alpha_x \cdot \frac{1}{2}\tilde{w}_k + \beta_x \cdot \Delta\tilde{w}_k\right); & \left(\alpha_x \cdot \frac{1}{2}\tilde{w}_k + \beta_x \cdot \Delta\tilde{w}_k\right) \end{cases}$$

wherein bounding box resizing hyperparameters as $\alpha_y=\alpha_x=0.9$, $\beta_y=\beta_x=0.1$.

Further, a method of establishing the parallel attention module in the second component is as follows.

As we all know, attention plays a very important role in human perception. When human eyes or ears and other organs acquire information, they tend to focus on more interesting targets and improve their attention; while suppressing uninteresting targets, reduce its attention. Inspired by human attention, some researchers recently proposed a bionic idea, attention mechanism: by embedding attention modules in neural networks, increase the weight of feature tensors in meaningful regions, reducing the weights of areas such as meaningless backgrounds, which can improve the performance of the network.

The present invention discloses a lightweight, plug-and-play parallel attention module PAM, configured to improves expressiveness of neural networks; wherein PAM considers two dimensions of feature map attention, spatial attention and channel attention force, and combine them in parallel;

giving an input feature map as $X \in \mathbb{R}^{C \times W \times H}$, wherein C, H and W denote channel, height and width, respectively; first, transforming $\mathcal{F}_1$ by implementing the spatial attention submodule: $X \rightarrow \tilde{U} \in \mathbb{R}^{C \times W \times H}$; then, transforming $\mathcal{F}_2$ by implementing the channel attention sub-module: $X \rightarrow \hat{U} \in \mathbb{R}^{C \times W \times H}$ finally, outputting feature map $U \in \mathbb{R}^{C \times W \times H}$; the transformations consists essentially of convolution, maximum pooling operation, mean pooling operation and ReLU function; and overall calculation process is as follows:

$$U = \tilde{U} \oplus \hat{U} = \mathcal{F}_1(X) \oplus \mathcal{F}_2(X)$$

wherein $\oplus$ represents output pixel-level tensor addition; the spatial attention sub-module is configured to emphasize "where" to improve attention, and pay attention to the locations of regions of interest (ROIs); first, maximum pooling and mean pooling operations are performed on the feature map along a channel direction to obtain several two-dimensional images, $\lambda_1 U_{avg\_s} \in \mathbb{R}^{1 \times W \times H}$ and $\lambda_2 U_{max\_s} \in \mathbb{R}^{1 \times W \times H}$, wherein $\lambda_1$ and $\lambda_2$ are adjust hyperparameters for different pooling operation weights, and taking $\lambda_1=2$, $\lambda_2=1$; $U_{avg\_s}$ 和 $U_{max\_s}$ are calculated by the following formulas, and MaxPool and AvgPool represent maximum pooling operation and the average pooling operation respectively;

$$U_{avg\_s}(1,i,j) = AvgPool(X) = \frac{1}{C}\sum_{k=1}^{C} X(k,i,j), i \in [1, W], j \in [1, H]$$

$$U_{max\_s}(1,i,j) = MaxPool(X) = \max_{k \in [1,C]}(X(k,i,j)), i \in [1, W], j \in [1, H]$$

Next, introducing convolution operation to generate the spatial attention weight $U_{spa} \in \mathbb{R}^{1 \times W \times H}$; the overall calculation process of the spatial attention sub-module is as follows:

$$\mathcal{F}_1(X) = \tilde{U} = U_{spa} \otimes X = \sigma(Conv([\lambda_1 U_{avg\_s}, \lambda_2 U_{max\_s}])) \otimes X$$

which is equivalent to:

$$\mathcal{F}_1(X) = \sigma(Conv([MaxPool(X), AvgPool(X), AvgPool(X)])) \otimes X$$

wherein, $\otimes$ represents pixel-level tensor multiplication, $\sigma$ represents a sigmoid activation function, Conv represents a convolution operation, and a convolution kernel size is 3×3; and a spatial attention weight is copied along a channel axis;

the channel attention sub-module is configured to find the relationship of internal channels, and care about "what" is interesting in a given feature map; first, mean pooling and max pooling are performed along width and height directions to generate a number of 1-$\mathbb{R}$ dimensional vector, $\lambda_3 U_{avg\_c} \in \mathbb{R}^{C \times 1 \times 1}$ and $\lambda_4 U_{max\_c} \in \mathbb{R}^{C \times 1 \times 1}$, and $\lambda_3$ and $\lambda_4$ are adjust hyperparameters for different pooling operation weights, and taking $\lambda_3=2$, $\lambda_4=1$; $U_{avg\_c}$ and $U_{max\_c}$ are calculated by the following formulas:

$$U_{avg\_c}(k, 1, 1) = AvgPool(X) = \frac{1}{W \times H} \sum_{i=1}^{W} \sum_{j=1}^{H} X(k, i, j), k \in [1, C]$$

$$U_{max\_c}(k, 1, 1) = MaxPool(X) = \max_{i \in [1,W], j \in [1,H]} (X(k, i, j)), k \in [1, C]$$

Subsequently, introducing point-wise convolution (PConv) as a channel context aggregator to realize point-wise inter-channel interaction; in order to reduce amount of parameters, PConv is designed in a form of an Hourglass, and setting an attenuation ratio to r; finally, channel attention is obtained force weight $U_{cha} \in \mathbb{R}^{C \times 1 \times 1}$; the calculation process of this sub-module is as follows:

$$\mathcal{F}_2(X) = \hat{U} = U_{cha} \otimes X = \sigma(\Sigma PConv([\lambda_3 U_{avg\_c}, \lambda_4 U_{max\_c}])) \otimes X$$

which is equivalent to $$\mathcal{F}_2(X) = \sigma(\Sigma PConv2(\delta(PConv1([\lambda_3 U_{avg\_c}, \lambda_4 U_{max\_c}])))) \otimes X$$

δ represents the ReLU activation function; the size of the convolution kernel of PConv1 is C/r×C×1×1, and the size of the convolution kernel of the inverse transform PConv2 is C×C/r×1×1; selecting ratio r as 16, the channel attention weights is copied along the width and height directions;

wherein the PAM is a plug-and-play module, which ensures the strict consistency of the input tensor and output tensor at a dimension level; PAM is configured to be embedded in any position of any convolutional neural network model as a supplementary module, the method of providing PAM embedding Hourglass and ResNet including: for the ResNet network, the PAM is embedded in the residual block after the batch normalization layer, before the residual connection, and the same in each residual block; for the Hourglass network, it is divided into two parts: downsampling and upsampling and the downsampling part embeds the PAM between the residual blocks, as a transition module, the upsampling part embeds the PAM before the residual connection. Details are presented in the drawings.

Further, the LIDAR-based unmanned surface vehicle of the third component comprises four modules including, a hull module, a video acquisition module, a lidar navigation module and ground station module, working together in a cooperative manner.

The hull module includes a trimaran and a power system; the trimaran is configured to be stable, resist level 6 wind and waves, and has an effective remote control distance of 500 meters, adaptable to engineering application scenarios; the size of the hull is 75×47×28 cm, which is convenient for transportation; an effective load of the surface vehicle is 5 kg, and configured to be installed with multiple scientific instruments; in addition, the unmanned surface vehicle has the function of constant speed cruise, which reduces the control burden of personnel.

The video acquisition module is composed of a three-axis camera pan/tilt, a fixed front camera and a fill light; the three-axis camera pan/tilt supports lox optical zoom, auto focus, photography and 60 FPS video recording; said video acquisition module is configured to meet the needs of faults of different scales and locations shooting requirements; the fixed front camera is configured to determine a hull posture; a picture is transmitted back to a ground station in real time through a wireless image transmission device, on the one hand for fault identification, on the other hand for assisting a control of the USV; a controllable LED fill light board is installed to cope with small and medium-sized bridges and other low-light working environments, which contains 180 high-brightness LED lamp beads; 3D print a pan/tilt carrying the LED fill light board to meet the needs of multi-angle fill light; in addition, a fixed front-view LED light is also installed beads, providing light source support for the front-view camera.

The lidar navigation module includes lidar, mini computer, a set of transmission system and control system; lidar is configured to perform 3600 omnidirectional scanning; after it is connected with the mini computer, it can perform real-time mapping of the surrounding environment of the unmanned surface vehicle; through wireless image transmission, the information of the surrounding scene is transmitted back to the ground station in real time, so as to realize the lidar navigation of the unmanned surface vehicle; based on the lidar navigation, the unmanned surface vehicle no longer needs GPS positioning, in areas with weak GPS signals such as under the bridges and underground culverts; the wireless transmission system supports real-time transmission of 1080 P video, with a maximum transmission distance of 10 kilometers; redundant transmission is used to ensure link stability and strong anti-interference; the control system consists of wireless image transmission equipment, Pixhawk 2.4.8 flight control and SKYDROID T12 receiver, and through the flight control and receiver, the control system effectively control the equipment on board.

The ground station module includes two remote controls and multiple display devices; a main remote control is used to control the unmanned surface vehicle, and a secondary remote control is used to control the surface vehicle borne scientific instruments, and the display device is used to monitor the real-time information returned by the camera and lidar; on the one hand, the display device displays the picture in real time, and on the other hand, it processes the image in real time to identify the fault; the devices cooperate with each other to realize the intelligent fault detection without a GPS signal.

The beneficial effects of the present invention are described below.

1. In terms of intelligent detection algorithm, the present invention is the first application of Anchor-free target detection algorithm in the field of structural faults. The detection results of the traditional Anchor-based method are affected by the setting of the prior frame (that is, the anchor boxes), which leads to this algorithm to deal with structural faults with complex shapes, various sizes, and various aspect ratio features (for example, the aspect ratio of the steel bar may be large, and the aspect ratio of the peeling may be small), the size and aspect ratio of the preset a priori frame will be very different from the target, which will cause low detection result recall rate. In addition, in order to achieve a better detection effect, a large number of a priori frames are often preset. This introduces many hyperparameters and design choices. This makes the design of the model more complex, and at the same time brings a larger amount of computation. Compared with the Anchor-based method, the method disclosed by the present invention abandons the complex a priori frame setting, directly predicts key points and related vectors (i.e. width, height and other information), and composes them into a detection frame. The method of the invention is simpler, more direct and effective, solves the problem fundamentally, and is more suitable for the detection of engineering structure faults with complex features. In addition, the present invention proposes a novel and lightweight attention module by considering the gain effect of the attention mechanism on the expressive ability of the neural network model. The experimental results show that the method described in the present invention is superior to multiple neural network models with extensive influence, and achieves a comprehensive and better effect in the two dimensions of efficiency and accuracy. The disclosed attention module can also improve different neural network models by sacrificing negligible computation.

2. In terms of intelligent detection equipment, the present invention discloses an unmanned surface vehicle solution that does not rely on GPS signals to detect faults at the bottom of small and medium bridges. Due to the constraints of design and performance, the current testing equipment is often not instrumental when inspecting a large number of small and medium-sized bridges. Taking drones as an example, their flight often requires a wider space free of interference and requires GPS-assisted positioning. However, in the area at the bottom of small and medium bridges with very low clearance, urban underground culverts and sewers, etc., the space is relatively closed, the GPS signal is often very weak, and the internal situation is very complicated. There are risks such as signal loss and collision damage when the drone flies in. And some areas are very small, there may be toxic gases, and it is difficult for humans to easily reach them. Therefore, the engineering community urgently needs a new type of intelligent detection equipment to detect areas that are difficult to detect by artificial and other intelligent equipment. The present invention takes the lead in a highly robust unmanned surface system suitable for fault detection in relatively closed areas. The experimental results show that while improving the detection efficiency, the system can reduce the safety risk and detection difficulty of engineers and save a lot of manpower cost, has strong engineering applicability and broad application prospects. In addition, the system proposed by the present invention is not only suitable for the bottom of medium and small bridges, but also has great application potential in engineering scenarios such as urban underground culverts and sewers.

DESCRIPTION OF DRAWINGS

FIG. 11 is a comparison table of the detection results between the algorithm framework in the present invention and other advanced target detection algorithms.

DESCRIPTION OF THE EMBODIMENTS

The present invention will be further described below with reference to the accompanying drawings and specific embodiments. It should be understood that the following specific embodiments are only used to illustrate the present invention and not to limit the scope of the present invention. After reading the present disclosure, those skilled in the art can make modifications to the various equivalent forms of the present disclosure within the scope defined by the appended claims of the present application.

Figure 1:
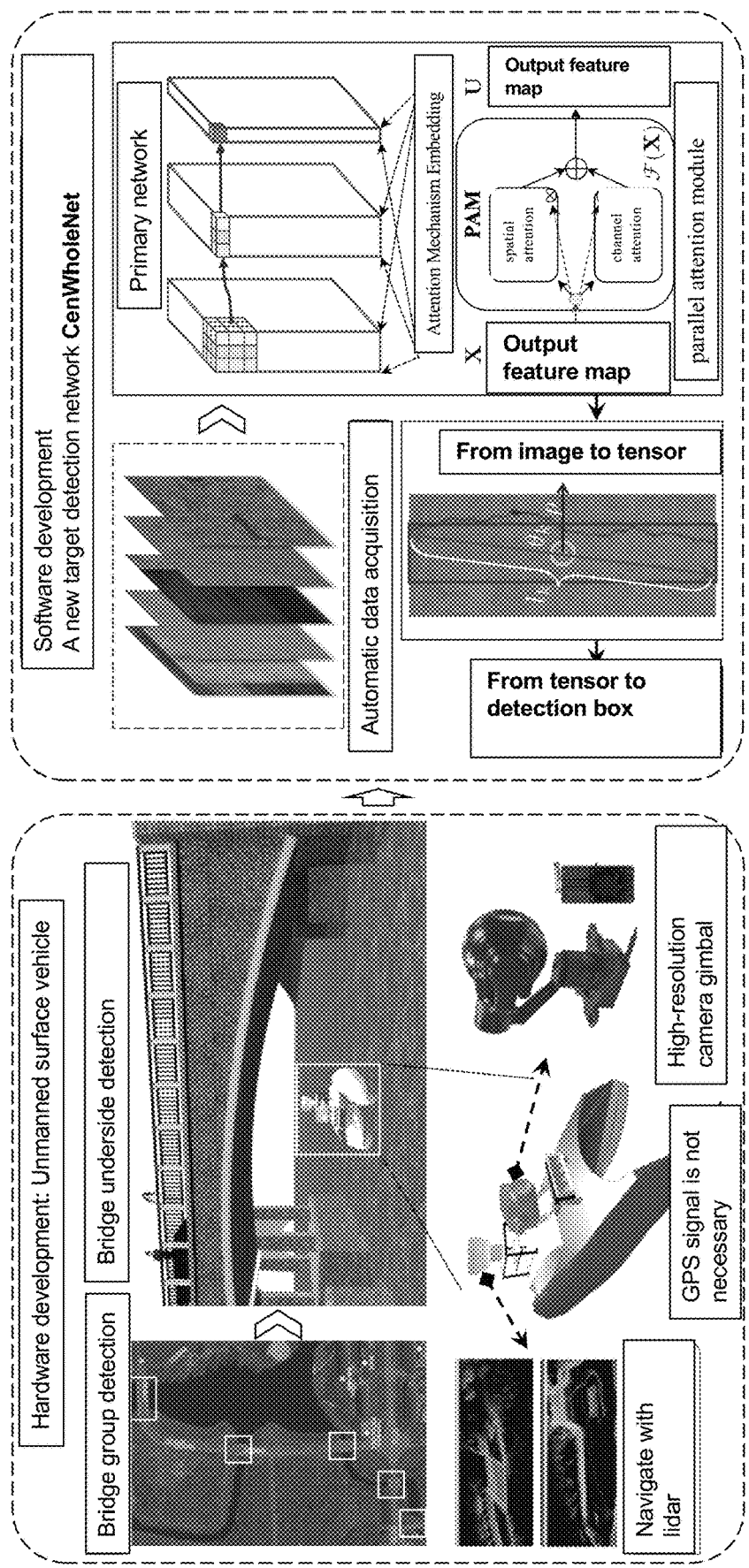
FIG. 1 is a schematic diagram of the overall framework in accordance with the aspects of the present invention.
Figure 2:
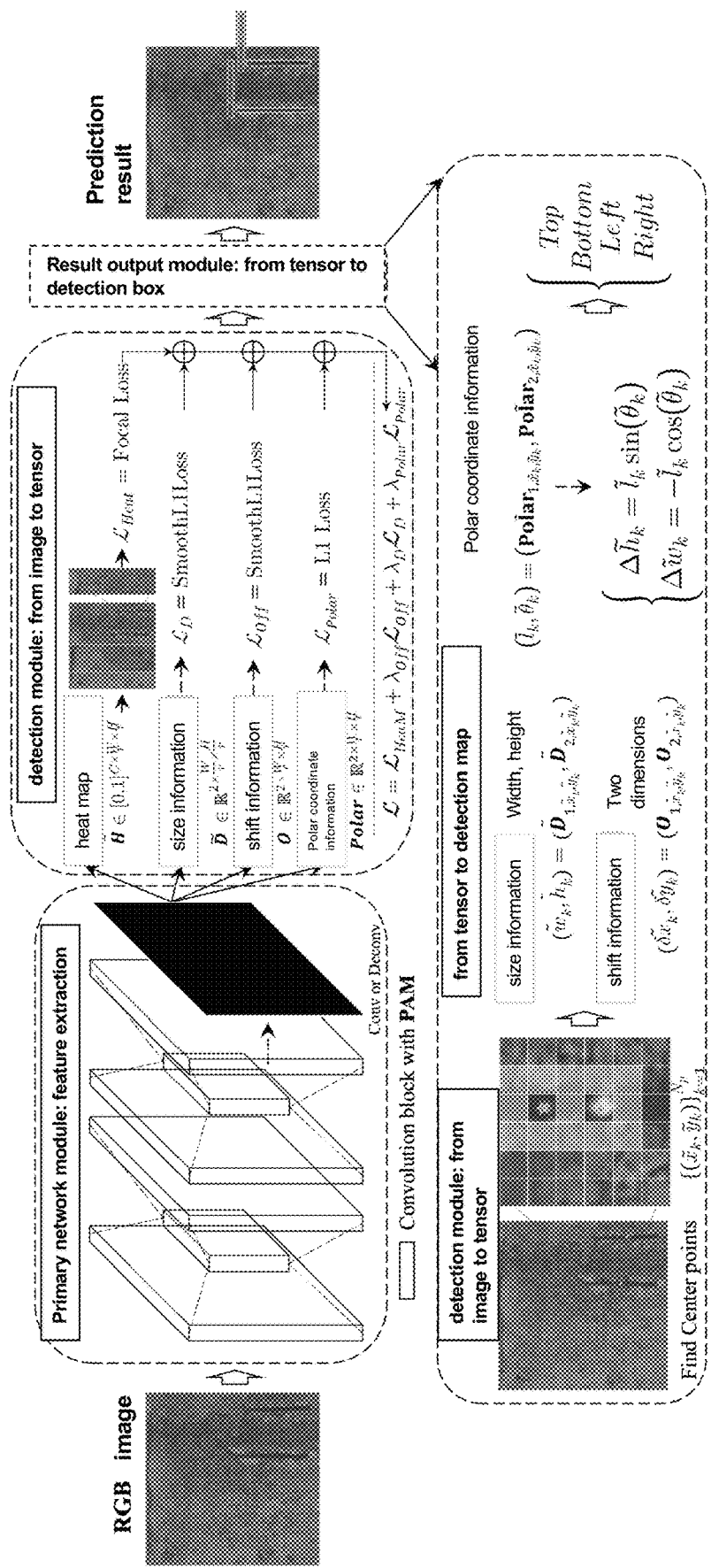
FIG. 2 is a schematic diagram of the CenWholeNet network in accordance with the aspects of the present invention.
Figure 3:
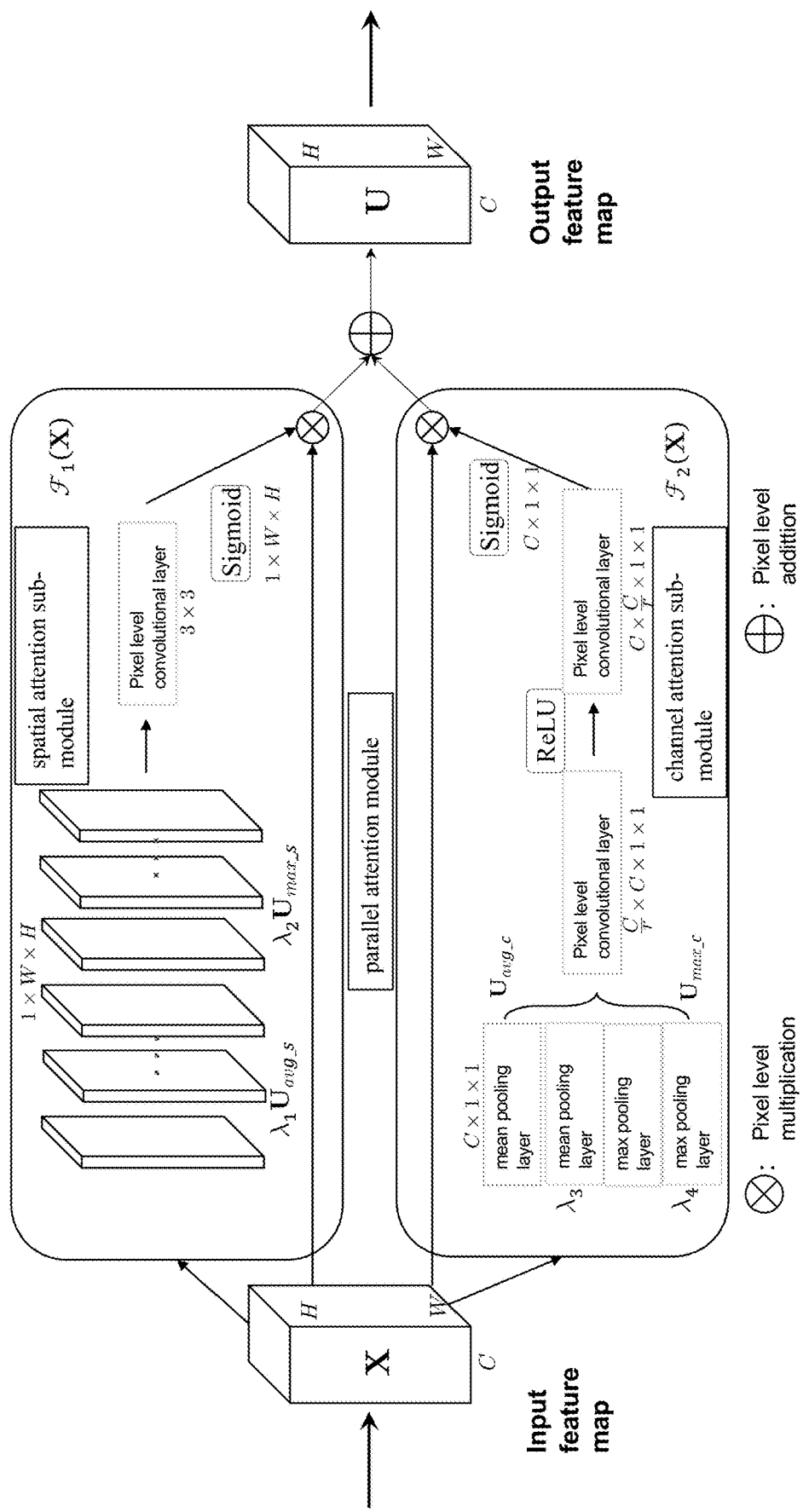
FIG. 3 is a detailed diagram of the attention module PAM in accordance with the aspects of the present invention.
Figure 4:
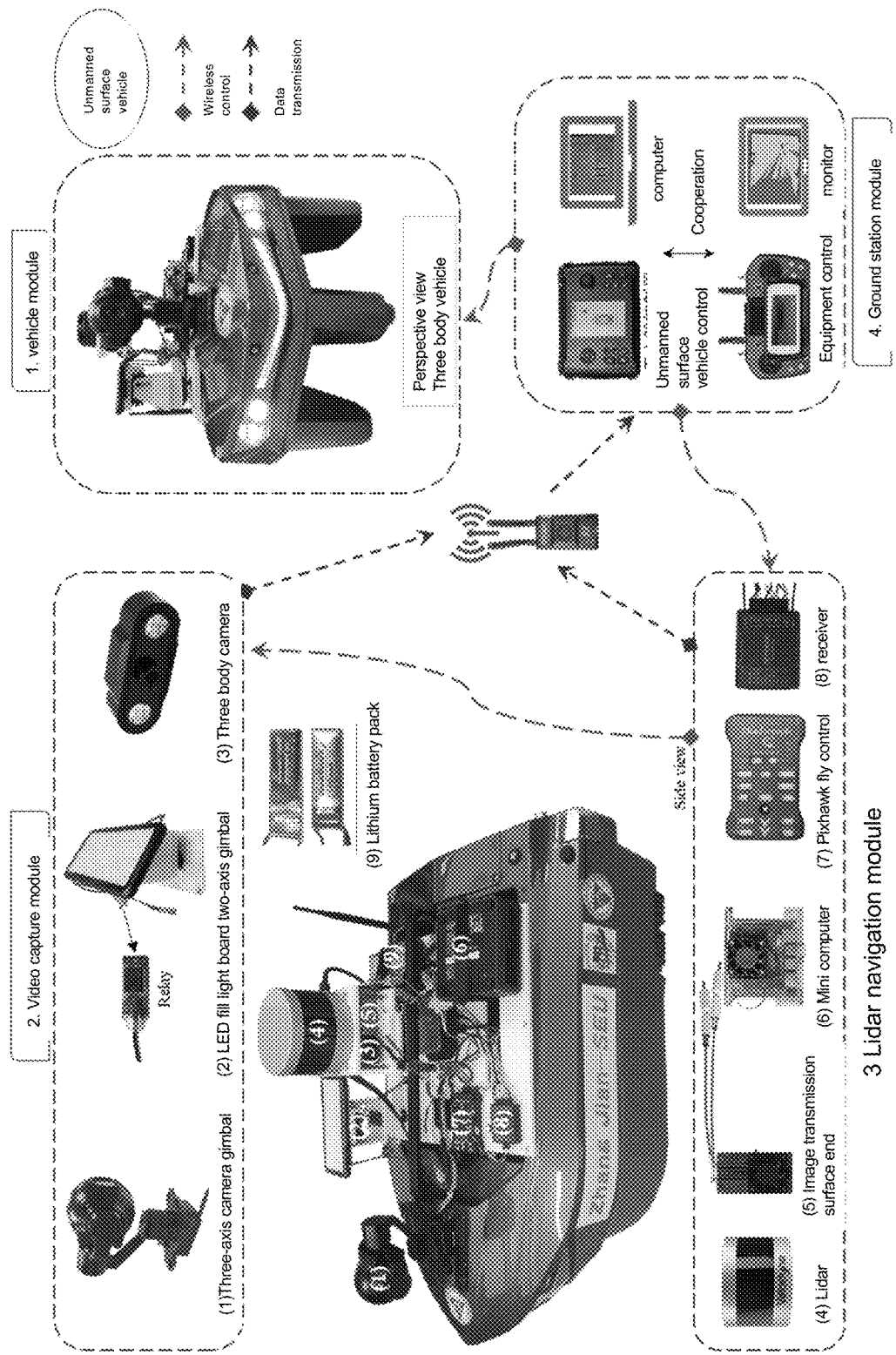
FIG. 4 is a schematic diagram of the architecture of the unmanned ship system in accordance with the aspects of the present invention.

An intelligent detection method for multi-type faults of near-water bridges. The overall flow chart of the technical solution is shown in FIG. 1, including the following components:

a first component, an intelligent detection algorithm: CenWholeNet, an infrastructure fault target detection network based on deep learning, described and illustrated in FIG. 2;

a second component, an embedded parallel attention module PAM into the target detection network CenWholeNet, the parallel attention module includes two sub-modules: a spatial attention sub-module and a channel attention sub-module, process is illustrated in FIG. 3;

a third component, an intelligent detection equipment assembly: an unmanned surface vehicle system based on lidar navigation, the unmanned surface vehicle includes four modules, a hull module, a video acquisition module, a lidar navigation module and a ground station module. Structural design of the unmanned surface vehicle is illustrated in FIG. 4.

Wherein the infrastructure fault target detection network CenWholeNet described in the first component comprises the following steps.

Step 1: a primary network: using the primary network to extract features of images;

Step 2: a detector: converting the extracted image features, by the detector, into tensor forms required for calculation, and optimizes a result through a loss function;

Step 3: result output: the result output includes converting the tensor into a boundary box and outputting of prediction results of target detection.

Wherein Step 1 of the infrastructure fault target detection network CenWholeNet in the first component has the primary network, the method of using the primary network is as follows: $\mathbb{R}$n giving an input image $P \in \mathbb{R}^{W \times H \times 3}$, wherein W is the width of the image, H is the height of the image, and 3 represents the number of channels of the image, that is, three RGB channels; extracting features of the input image P through the primary network; using two convolutional neural network models, Hourglass network and deep residual network ResNet.

Wherein Step 2 of the infrastructure fault target detection network CenWholeNet in the first component has the detector, the method of using the detector is as follows:

converting the features extracted by the primary network into an output set consisting of 4 tensors $\tilde{S} = [\tilde{H}, \tilde{D}, \tilde{O}, \widetilde{Polar}]$, by the detector, as a core of CenWholeNet; using $$\tilde{H} \in [0,1]^{C \times \frac{W}{r} \times \frac{H}{r}}$$

to represent a heat map of a central key point, where C is a category of the fault, which is taken as C=3 here, and r is an output step size, that is, the down sampling ratio, wherein a default step size is 4 and by down sampling, the calculation efficiency is improved; defining $$H \in [0,1]^{C \times \frac{W}{r} \times \frac{H}{r}}$$

as a ground-truth heatmap, for category c, the ground-truth center point of location (i,j) is $p_{cij} \in \mathbb{R}^{C \times W \times H}$; First computing its down sampled equivalent position $$\hat{p}_{cxy} \in \mathbb{R}^{C \times \frac{W}{r} \times \frac{H}{r}},$$

wherein $$x = \left\lfloor \frac{i}{r} \right\rfloor,$$

$$y = \left\lfloor \frac{j}{r} \right\rfloor;$$

then through a Gaussian kernel function, map $$\hat{p}_{cxy} \in \mathbb{R}^{C \times \frac{W}{r} \times \frac{H}{r}}$$

to tensor $$Y_p \in \mathbb{R}^{C \times \frac{W}{r} \times \frac{H}{r}} 中,$$

Figure 5:
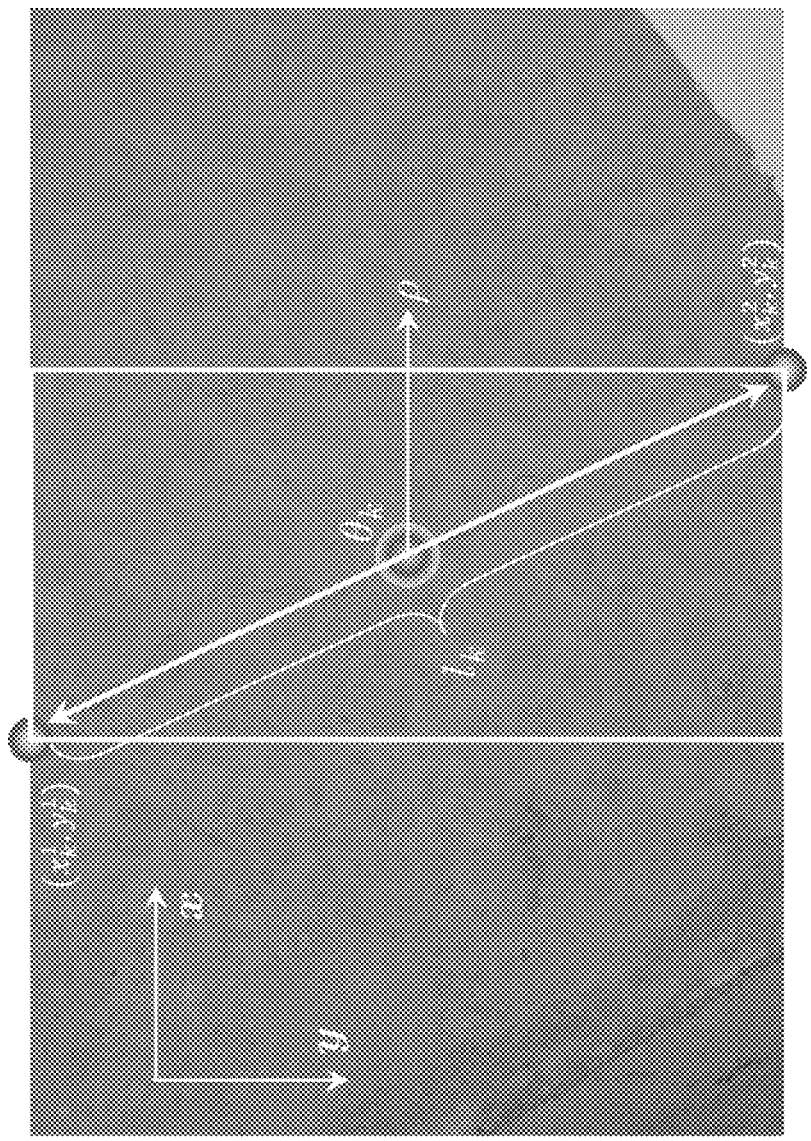
FIG. 5 is a schematic diagram of the polar coordinate supplementary information in accordance with the aspects of the present invention.

$Y_p$ is defined by $$Y_p(c, x, y) = \exp\left(-\frac{(x - \hat{p}_{cxy}(x))^2 + (y - \hat{p}_{cxy}(y))^2}{2\sigma_p^2}\right)$$

wherein $\hat{p}_{cxy}(x)$ and $\hat{p}_{cxy}(y)$ represent center point position (x,y), $\sigma_p$=gaussian_radius/3; and gaussian_radius represent a maximum radius representing an offset of the corner points of a detection frame, wherein the maximum radius ensures that the intersection ratio between the offset detection frame and the ground-truth detection frame is IoU≥t, and t=0.7 is taken in all experiments; integrating all the corresponding $Y_p$ points to get the ground-truth heat map H:

$$H_{c,x,y} = \max_p[Y_p(c, x, y)], c \in [1, C], x \in \left[1, \frac{W}{r}\right], y \in \left[1, \frac{H}{r}\right]$$

wherein, $H_{c,x,y}$ represents a value of H at the position (c,x,y), a probability that this position is a center point; specifically, $H_{c,x,y}$=1 represents a central key point, a positive sample; conversely, $H_{c,x,y}$=0 is a background and the negative sample; focal loss as a metric to measure a distance between I and H, according to the following equation:

$$\mathcal{L}_{Heat} = -\frac{1}{N} \sum_{c=1}^{C} \sum_{x=1}^{W/r} \sum_{y=1}^{H/r} \begin{cases} (1 - \tilde{H}_{c,x,y})^\alpha \log(\tilde{H}_{c,x,y}) & \text{if } H_{c,x,y} = 1 \\ (\tilde{H}_{c,x,y})^\alpha \log(1 - \tilde{H}_{c,x,y}) & \text{Otherwise} \\ (1 - \tilde{H}_{c,x,y})^\beta \end{cases}$$

wherein N is a total count of all central key points, α and β are hyperparameters, configured to control the weights; in all cases, α=2, β=4; by minimizing $\mathcal{L}_{Heat}$, the neural network model is configured to better predict a position of a center point of the target;

obtaining a size information W×H of a prediction box to finally determine the boundary box;

defining a size of the ground-truth boundary box corresponding to the $k^{th}$ key point $p_k$ be $d_k = (w_k, h_k)$, and integrate all $d_k$ to get the ground-truth boundary box dimension tensor $$D \in \mathbb{R}^{2 \times \frac{W}{r} \times \frac{H}{r}}:$$

$$D = d_1 \oplus d_2 \oplus \ldots \oplus d_N$$

wherein ⊕ represents pixel-level addition; for all fault categories, the model is configured to give a predicted dimension tensor $$\tilde{D} \in \mathbb{R}^{2 \times \frac{W}{r} \times \frac{H}{r}},$$

and L1 Loss is configured to measure D and $\tilde{D}$ similarity, determined by the following equation:

$$\mathcal{L}_D = \frac{1}{N} \sum_{k=1}^{N} SmoothL1Loss(\tilde{d}_k, d_k) = \frac{1}{N} \sum_{k=1}^{N} \begin{cases} 0.5 \|\tilde{d}_k - d_k\|_2^2 & \text{if } \|\tilde{d}_k - d_k\|_1 < 1 \\ \|\tilde{d}_k - d_k\|_1 - 0.5 & \text{Otherwise} \end{cases}$$

obtaining a rough width and height of each prediction box by minimizing $\mathcal{L}_D$, by the model;

correcting an error caused by down sampling by introducing a position offset, because the image is scaled by r times; recording the coordinates of the $k^{th}$ key point $p_k$ as $(x_k, y_k)$, then the mapped coordinates are $(\lfloor x_k/r \rfloor, \lfloor y_k/r \rfloor)$, then get the ground-truth offset:

$$o_k = \left(\frac{x_k}{r} - \left\lfloor \frac{x_k}{r} \right\rfloor, \frac{y_k}{r} - \left\lfloor \frac{y_k}{r} \right\rfloor\right)$$

integrating all $o_k$ to get the ground-truth offset matrix $$O \in \mathbb{R}^{2 \times \frac{W}{r} \times \frac{H}{r}}:$$

$$O = o_1 \oplus o_2 \oplus \ldots \oplus o_N$$

wherein, the 2 of a first dimension represents the offset of the key point (x, y) in the W and H directions; correspondingly, the model will give a prediction tensor $$\tilde{O} \in \mathbb{R}^{2 \times \frac{W}{r} \times \frac{H}{r}},$$

and smooth L1 Loss is used to train the offset loss:

$$\mathcal{L}_{Off} = \frac{1}{N}\sum_{k=1}^{N} SmoothL1Loss(\tilde{o}_k, o_k) = \frac{1}{N}\sum_{k=1}^{N}\begin{cases} 0.5\|\tilde{o}_k - o_k\|_2^2 & \text{if } \|\tilde{o}_k - o_k\|_1 < 1 \\ \|\tilde{o}_k - o_k\|_1 - 0.5 & \text{Otherwise} \end{cases}$$

introducing a new set of tensors to modify the prediction frame and improve the detection accuracy, in order to make the model pay more attention to the overall information of the target; specifically, taking an angle between the connecting line of a diagonal point of the detection frame and the x-axis, and the diagonal length of the detection frame as the training targets, as shown in FIG. 5; defining coordinates of an upper left corner and lower right corner of the detection frame to be $(x_k^1, y_k^1)$ and $(x_k^2, y_k^2)$, so the diagonal length of the detection frame $l_k$ is calculated as:

$$l_k = \sqrt{(x_k^1 - x_k^2)^2 + (y_k^1 - y_k^2)^2}$$

an inclination of a connecting line between the upper left and lower right corners $\theta_k$ is calculated by the following formula:

$$\theta_k = \pi - \arctan\left(\frac{y_k^2 - y_k^1}{x_k^2 - x_k^1}\right)$$

constructing a pair of complementary polar coordinates $$\text{polar}_k = \left(\frac{1}{2}l_k, \theta_k\right)$$

and further to obtain a ground-truth polar coordinate matrix $$\text{Polar} \in \mathbb{R}^{2 \times \frac{W}{r} \times \frac{H}{r}}:$$

$$\text{Polar} = \left(\frac{1}{2}l_1, \theta_1\right) \oplus \left(\frac{1}{2}l_2, \theta_2\right) \oplus \ldots \oplus \left(\frac{1}{2}l_N, \theta_N\right)$$

the model also gives a prediction tensor $$\widetilde{\text{Polar}} \in \mathbb{R}^{2 \times \frac{W}{r} \times \frac{H}{r}};$$

Polar and $\widetilde{\text{Polar}}$ is trained by a same L1 loss:

$$\mathcal{L}_{Polar} = \frac{1}{N}\sum_{k=1}^{N} \|\widetilde{\text{polar}}_k - \text{polar}_k\|_1$$

Finally for each position, the model will predict the output of C+6, which will form the set $\tilde{S} = [\tilde{H}, \tilde{D}, \tilde{O}, \widetilde{\text{Polar}}]$, which will also share the weights of the network; and the loss function of is defined by:

$$\mathcal{L} = \mathcal{L}_{Heat} + \lambda_{Off}\mathcal{L}_{Off} + \lambda_D\mathcal{L}_D + \lambda_{Polar}\mathcal{L}_{Polar}$$

Wherein all the experiments, $\lambda_{Off}=10$, $\lambda_D$ and $\lambda_{Polar}$ are both take as 0.1.

In Step 3 of the infrastructure fault target detection network CenWholeNet in the first component, the method of outputting a result is as follows:

outputting results by extracting a possible center keypoint coordinates from a predicted heatmap tensor $\tilde{H}$, and then obtaining a predicted bounding box according to the information in the corresponding $\tilde{D}$, $\tilde{O}$ and $\widetilde{\text{Polar}}$; wherein the greater the value of $\tilde{H}_{c,x,y}$, the more likely it is the center point; for category c, if the point $p_{cxy}$ satisfies the following formula, it is considered that $p_{cxy}$ is an candidate center point;

$$\tilde{H}_{c,x,y} = \max_{i^2 \leq 1, j^2 \leq 1, i,j \in \mathbb{Z}} [\tilde{H}_{c,x+i,y+j}]$$

wherein we do not need non-maximum suppression (NMS), using a 3×3 max-pooling convolutional layer to extract candidate center points; letting a set of center points be $\tilde{P} = \{(\tilde{x}_k, \tilde{y}_k)\}_{k=1}^{N_p}$, wherein $N_p$ is a total number of selected center points; for any center points $(\tilde{x}_k, \tilde{y}_k)$, extract corresponding size information $(\tilde{w}_k, \tilde{h}_k) = (\tilde{D}_{1,\tilde{x}_k,\tilde{y}_k}, \tilde{D}_{2,\tilde{x}_k,\tilde{y}_k})$, offset information $(\delta\tilde{x}_k, \delta\tilde{y}_k) = (\tilde{O}_{1,\tilde{x}_k,\tilde{y}_k}, \tilde{O}_{2,\tilde{x}_k,\tilde{y}_k})$ and polar coordinate information $(\tilde{l}_k, \tilde{\theta}_k) = (\widetilde{\text{Polar}}_{1,\tilde{x}_k,\tilde{y}_k}, \widetilde{\text{Polar}}_{2,\tilde{x}_k,\tilde{y}_k})$; first, calculate the prediction frame size correction value according to $(\tilde{l}_k, \tilde{\theta}_k)$:

$$\begin{cases} \Delta\tilde{h}_k = \tilde{l}_k \sin(\tilde{\theta}_k) \\ \Delta\tilde{w}_k = -\tilde{l}_k \cos(\tilde{\theta}_k) \end{cases}$$

defining specific location of the prediction box as $$\begin{cases} \text{Top} = \tilde{y}_k + \delta\tilde{y}_k - \left(\alpha_y \cdot \frac{1}{2}\tilde{h}_k + \beta_y \cdot \Delta\tilde{h}_k\right); \\ \text{Bottom} = \tilde{y}_k + \delta\tilde{y}_k + \left(\alpha_y \cdot \frac{1}{2}\tilde{h}_k + \beta_y \cdot \Delta\tilde{h}_k\right) \\ \text{Left} = \tilde{x}_k + \delta\tilde{x}_k - \left(\alpha_x \cdot \frac{1}{2}\tilde{w}_k + \beta_x \cdot \Delta\tilde{w}_k\right); \\ \text{Right} = \tilde{x}_k + \delta\tilde{x}_k + \left(\alpha_x \cdot \frac{1}{2}\tilde{w}_k + \beta_x \cdot \Delta\tilde{w}_k\right) \end{cases}$$

wherein bounding box resizing hyperparameters as $\alpha_y = \alpha_x = 0.9$, $\beta_y = \beta_x = 0.1$.

Further, a method of establishing the parallel attention module in the second component is as follows.

As we all know, attention plays a very important role in human perception. When human eyes or ears and other organs acquire information, they tend to focus on more interesting targets and improve their attention; while suppressing uninteresting targets, reduce its attention. Inspired by human attention, some researchers recently proposed a bionic idea, attention mechanism: by embedding attention modules in neural networks, increase the weight of feature tensors in meaningful regions, reducing the weights of areas such as meaningless backgrounds, which can improve the performance of the network.

The present invention discloses a lightweight, plug-and-play parallel attention module PAM, configured to improves expressiveness of neural networks; wherein PAM considers two dimensions of feature map attention, spatial attention and channel attention force, and combine them in parallel;

giving an input feature map as $X \in \mathbb{R}^{C \times W \times H}$ wherein C, H and W denote channel, height and width, respectively; first, transforming $\mathcal{F}_1$ by implementing the spatial attention sub-module: $X \to \tilde{U} \in \mathbb{R}^{C \times W \times H}$; then, transforming $\mathcal{F}_2$ by implementing the channel attention sub-module: $X \to \hat{U} \in \mathbb{R}^{C \times W \times H}$; finally, outputting feature map $U \in \mathbb{R}^{C \times W \times H}$; transformations consists essentially of convolution, maximum pooling operation, mean pooling operation and ReLU function; and overall calculation process is as follows:

$$U = \tilde{U} \oplus \hat{U} = \mathcal{F}_1(X) \oplus \mathcal{F}_2(X)$$

wherein $\oplus$ represents output pixel-level tensor addition; the spatial attention sub-module is configured to emphasize "where" to improve attention, and pay attention to the locations of regions of interest (ROIs); first, maximum pooling and mean pooling operations are performed on the feature map along a channel direction to obtain several two-dimensional images, $\lambda_1 U_{avg\_s} \in \mathbb{R}^{1 \times W \times H}$ and $\lambda_2 U_{max\_s} \in \mathbb{R}^{1 \times W \times H}$ wherein $\lambda_1$ and $\lambda_2$ are adjust hyperparameters for different pooling operation weights, and taking $\lambda_1 = 2$, $\lambda_2 = 1$; $U_{avg\_s}$ 和 $U_{max\_s}$ are calculated by the following formulas, and MaxPool and AvgPool represent maximum pooling operation and the average pooling operation respectively;

$$U_{avg\_s}(1, i, j) = AvgPool(X) = \frac{1}{C}\sum_{k=1}^{C} X(k, i, j),$$

$i \in [1, W], j \in [1, H]$ $$U_{max\_s}(1, i, j) = MaxPool(X) = \max_{k \in [1,C]}(X(k, i, j)),$$

$i \in [1, W], j \in [1, H]$

Next, introducing convolution operation to generate the spatial attention weight $U_{spa} \in \mathbb{R}^{1 \times W \times H}$; the overall calculation process of the spatial attention sub-module is as follows:

$$\mathcal{F}_1(X) = \tilde{U} = U_{spa} \otimes X = \sigma(Conv([\lambda_1 U_{avg\_s}, \lambda_2 U_{max\_s}])) \otimes X$$

which is equivalent to:

$$\mathcal{F}_1(X) = \sigma(Conv([MaxPool(X), AvgPool(X), AvgPool(X)])) \otimes X$$

wherein, $\otimes$ represents pixel-level tensor multiplication, $\sigma$ represents a sigmoid activation function, Conv represents a convolution operation, and a convolution kernel size is 3×3; and a spatial attention weight is copied along a channel axis;

the channel attention sub-module is configured to find the relationship of internal channels, and care about "what" is interesting in a given feature map; first, mean pooling and max pooling are performed along width and height directions to generate a number of 1-dimensional vector, $\lambda_3 U_{avg\_c} \in \mathbb{R}^{C \times 1 \times 1}$ and $\lambda_4 U_{max\_c} \in \mathbb{R}^{C \times 1 \times 1}$, and $\lambda_3$ and $\lambda_4$ are adjust hyperparameters for different pooling operation weights, and taking $\lambda_3 = 2$, $\lambda_4 = 1$; $U_{avg\_c}$ and $U_{max\_c}$ are calculated by the following formulas:

$$U_{avg\_c}(k, 1, 1) = AvgPool(X) = \frac{1}{W \times H}\sum_{i=1}^{W}\sum_{j=1}^{H} X(k, i, j),$$

$k \in [1, C]$ $$U_{max\_c}(k, 1, 1) = MaxPool(X) = \max_{i \in [1,W], j \in [1,H]}(X(k, i, j)), k \in [1, C]$$

Subsequently, introducing point-wise convolution (PConv) as a channel context aggregator to realize point-wise inter-channel interaction; in order to reduce amount of parameters, PConv is designed in a form of an Hourglass, and setting an attenuation ratio to r; finally, channel attention is obtained force weight $U_{cha} \in \mathbb{R}^{C \times 1 \times 1}$; the calculation process of this sub-module is as follows:

$$\mathcal{F}_2(X) = \hat{U} = U_{cha} \otimes X = \sigma(\Sigma PConv([\lambda_3 U_{avg\_c}, \lambda_4 U_{max\_c}])) \otimes X$$

which is equivalent to:

$$\mathcal{F}_2(X) = \sigma(\Sigma PConv2(\delta(PConv1([\lambda_3 U_{avg\_c}, \lambda_4 U_{max\_c}])))) \otimes X$$

Figure 6:
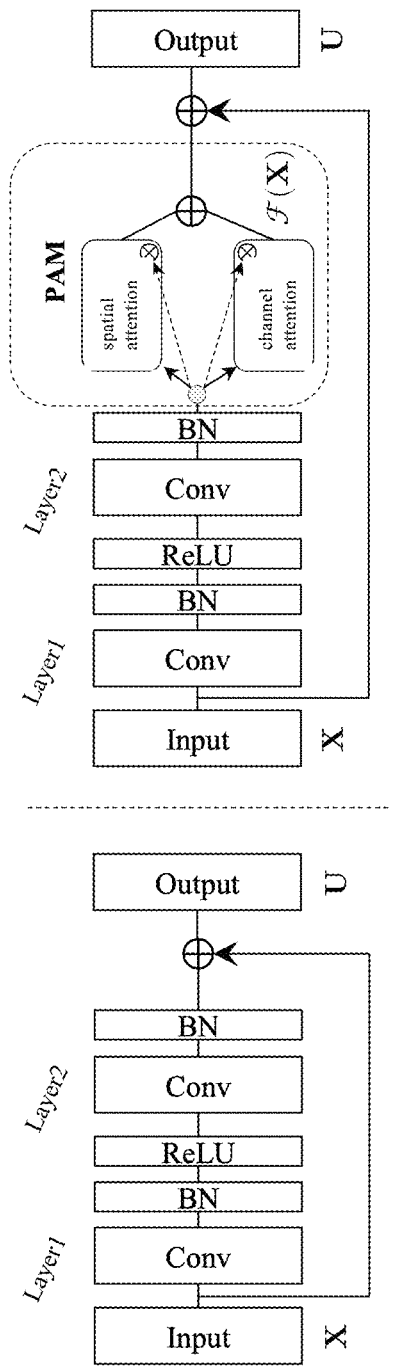
FIG. 6 the proposed PAM embedded ResNet network scheme diagram in accordance with the aspects of the present invention.
Figure 7:
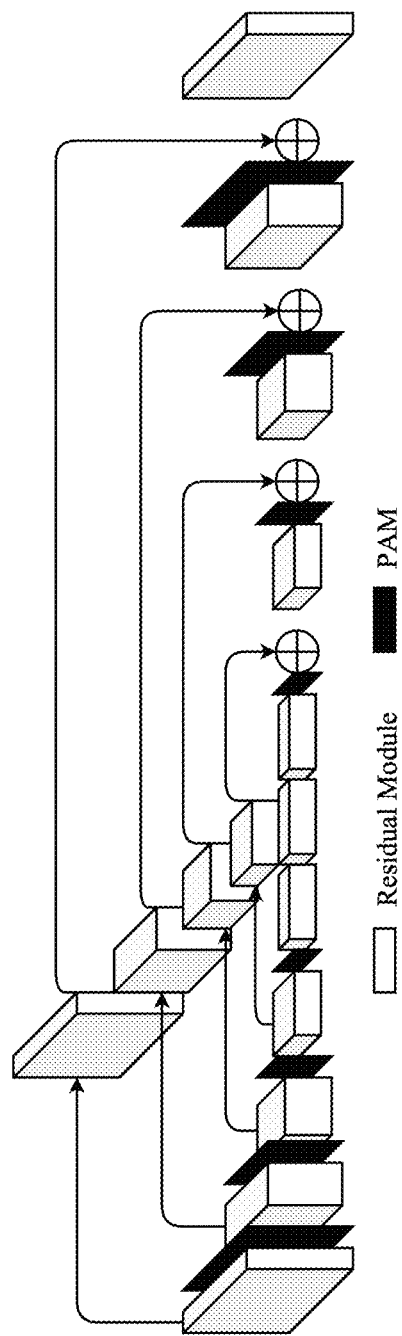
FIG. 7 PAM embedded Hourglass network scheme diagram in accordance with the aspects of the present invention.

$\delta$ represents the ReLU activation function; the size of the convolution kernel of PConv1 is C/r×C×1×1, and the size of the convolution kernel of the inverse transform PConv2 is C×C/r×1×1; selecting ratio r as 16, the channel attention weights is copied along the width and height directions;

wherein the PAM is a plug-and-play module, which ensures the strict consistency of the input tensor and output tensor at a dimension level; PAM is configured to be embedded in any position of any convolutional neural network model as a supplementary module, the method of providing PAM embedding Hourglass and ResNet including: for the ResNet network, the PAM is embedded in the residual block after the batch normalization layer, before the residual connection, and the same in each residual block; for the Hourglass network, it is divided into two parts: downsampling and upsampling and the downsampling part embeds the PAM between the residual blocks, as a transition module, the upsampling part embeds the PAM before the residual connection. Details of embedment is illustrated in FIG. 6 and FIG. 7.

Further, the LIDAR-based unmanned surface vehicle of the third component comprises four modules including, a hull module, a video acquisition module, a lidar navigation module and ground station module, working together in a cooperative manner.

The hull module includes a trimaran and a power system; the trimaran is configured to be stable, resist level 6 wind and waves, and has an effective remote control distance of 500 meters, adaptable to engineering application scenarios; the size of the hull is 75×47×28 cm, which is convenient for transportation; an effective load of the surface vehicle is 5 kg, and configured to be installed with multiple scientific instruments; in addition, the unmanned surface vehicle has the function of constant speed cruise, which reduces the control burden of personnel.

The video acquisition module is composed of a three-axis camera pan/tilt, a fixed front camera and a fill light; the three-axis camera pan/tilt supports 10× optical zoom, auto focus, photography and 60 FPS video recording; said video acquisition module is configured to meet the needs of faults of different scales and locations shooting requirements; the fixed front camera is configured to determine a hull posture; a picture is transmitted back to a ground station in real time through a wireless image transmission device, on the one hand for fault identification, on the other hand for assisting a control of the USV; a controllable LED fill light board is installed to cope with small and medium-sized bridges and other low-light working environments, which contains 180 high-brightness LED lamp beads; 3D print a pan/tilt carrying the LED fill light board to meet the needs of multi-angle fill light; in addition, a fixed front-view LED light is also installed beads, providing light source support for the front-view camera.

The lidar navigation module includes lidar, mini computer, a set of transmission system and control system; lidar is configured to perform 360° omnidirectional scanning; after it is connected with the mini computer, it can perform real-time mapping of the surrounding environment of the unmanned surface vehicle; through wireless image transmission, the information of the surrounding scene is transmitted back to the ground station in real time, so as to realize the lidar navigation of the unmanned surface vehicle; based on the lidar navigation, the unmanned surface vehicle no longer needs GPS positioning, in areas with weak GPS signals such as under the bridges and underground culverts; the wireless transmission system supports real-time transmission of 1080 P video, with a maximum transmission distance of 10 kilometers; redundant transmission is used to ensure link stability and strong anti-interference; the control system consists of wireless image transmission equipment, Pixhawk 2.4.8 flight control and SKYDROID T12 receiver, and through the flight control and receiver, the control system effectively control the equipment on board.

The ground station module includes two remote controls and multiple display devices; a main remote control is used to control the unmanned surface vehicle, and a secondary remote control is used to control the surface vehicle borne scientific instruments, and the display device is used to monitor the real-time information returned by the camera and lidar; on the one hand, the display device displays the picture in real time, and on the other hand, it processes the image in real time to identify the fault; the devices cooperate with each other to realize the intelligent fault detection without a GPS signal.

Embodiment 1

Figure 8:
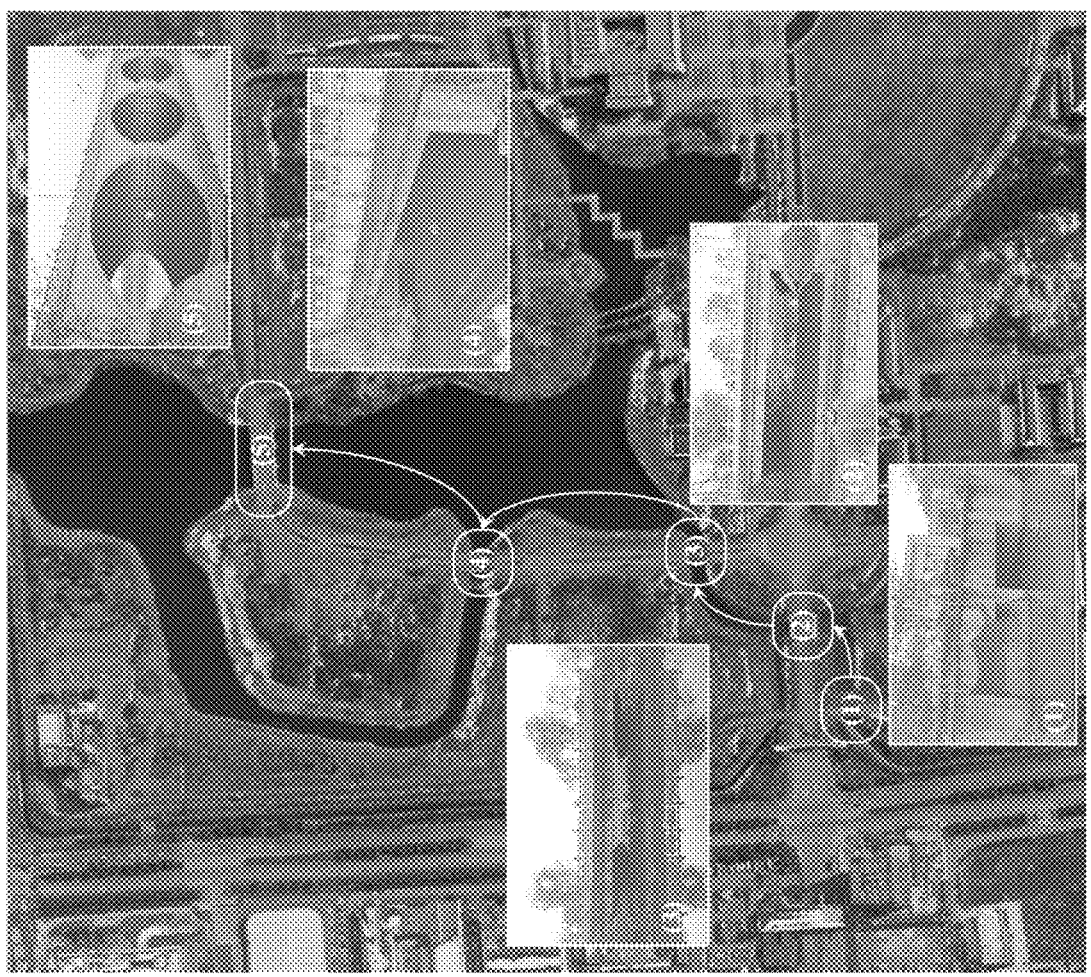
FIG. 8 is a schematic diagram of the application of the method in accordance with the aspects of the present invention in a bridge group.
Figure 9:
FIG. 9 is a schematic diagram of the real-time mapping of the unmanned surface vehicle in accordance with the aspects of the present invention.

The inventors tested the proposed technical solutions of the present invention under the condition of a water system bridge group (for example, Jiulong Lake water system bridge group in Nanjing, Jiangsu Province, China), as shown in FIG. 8. The 3D lidar carried by the unmanned surface vehicle is combined with the SLAM algorithm, and the real-time mapping effect is shown in FIG. 9. There are 5 small and medium sized bridges in the bridge group. The collected images include three types of faults: cracking, flaking and rebar exposure. The pixel resolution of the fault images is 512×512. Model building, training and testing based on the PyTorch deep learning framework. The Batch-size during training is taken as 2, the Batchsize during testing is taken as 1, and the learning rate is taken as $5\times10^{-4}$. The detection result of the solution proposed by the present invention is shown in FIG. 9, and the heat map is the visual result directly output by the network, which can provide evidence for the result of target detection.

The detection method disclosed in the present invention is also compared with the state-of-the-art object detection models on the same dataset, including the widely influential object detection method Faster R-CNN in Anchor-based methods and obtained in the industry. The latest YOLOv5 model in the widely used YOLO method, the acclaimed CenterNet method in Anchor-free. In addition, we also compared attention module PAM of the present invention with SENet and CBAM, the excellent and classic attention modules recognized by the deep learning community.

The chosen evaluation metrics are the average precision AP and average recall AR, which are commonly used in the deep learning field. They are the average values of different categories and different images. The calculation process is briefly described below. First introduce a key concept, the intersection of IoU. It is a common concept in the field of target detection. It measures the degree of overlap between the candidate box, that is, the prediction result of the model and the ground-truth bounding box, that is, the ratio of intersection and union, which can be calculated by the following formula.

$$IoU = \frac{\text{area(Prediction results} \cap \text{GroundTruth)}}{\text{area(Prediction results} \cup \text{GroundTruth)}}$$

For each prediction box, three relationships are considered between it and the ground-truth bounding box. The number of prediction boxes with the IoU of the ground-truth bounding box greater than the specified threshold is recorded as the true class TP; the number of prediction boxes with the IoU of the ground truth bounding box less than the threshold is recorded as the false positive class FP, the number of undetected ground-truth bounding box, denoted as false negative class FP. Then the accuracy can be calculated as $$\text{Precision} = \frac{TP}{TP+FP} = \frac{TP}{\text{all detections}}$$

The recall rate can be calculated as $$\text{Recall} = \frac{TP}{TP+FN} = \frac{TP}{\text{all ground truths}}$$

Therefore, depending on the IoU threshold, different accuracies can be calculated. The IoU is usually divided into 10 classes, 0.50:0.05:0.95. $AP_{50}$ used in the example is the precision when the IoU threshold is 0.50, $AP_{75}$ is the precision when the IoU threshold is 0.75, and the average precision AP represents the average precision under 10 IoU thresholds, that is, $$AP = \frac{1}{10}(AP_{50} + AP_{55} + AP_{60} + \ldots + AP_{95})$$

This is the most important metric to measure model checking performance. The average recall AR is the maximum recall for each image given 1, 10, and 100 detections. Then averaging under the category and 10 IoU thresholds, 3 sub-indicators $AR_1$, $AR_{10}$ and $AR_{100}$ can be obtained. Obviously, the closer the values of AP and AR are to 1, the better the test results and the closer to the label.

Figure 10:
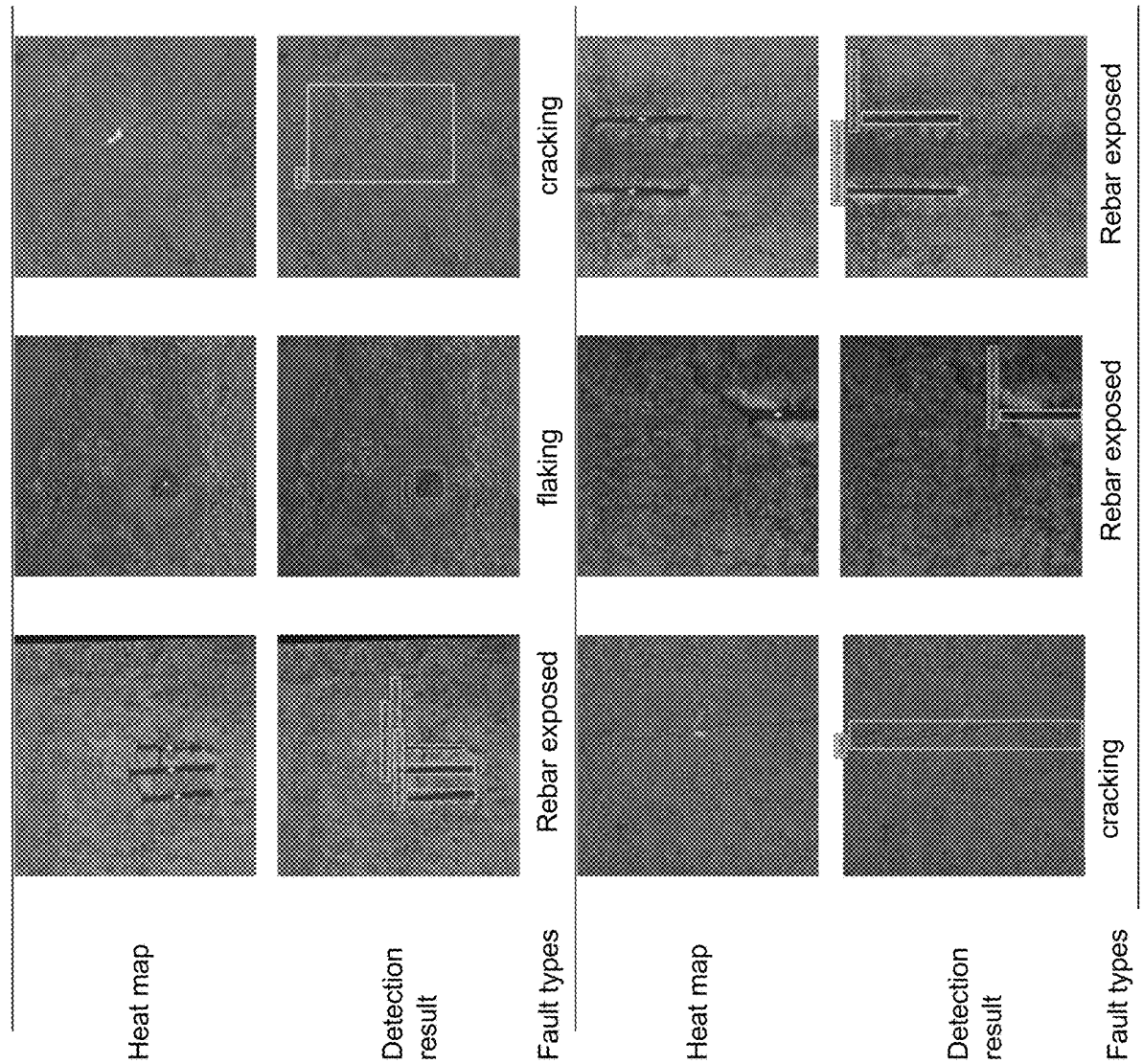
FIG. 10 is a schematic diagram of the detection results of the method in accordance with the aspects of the present invention.
Figure 12:
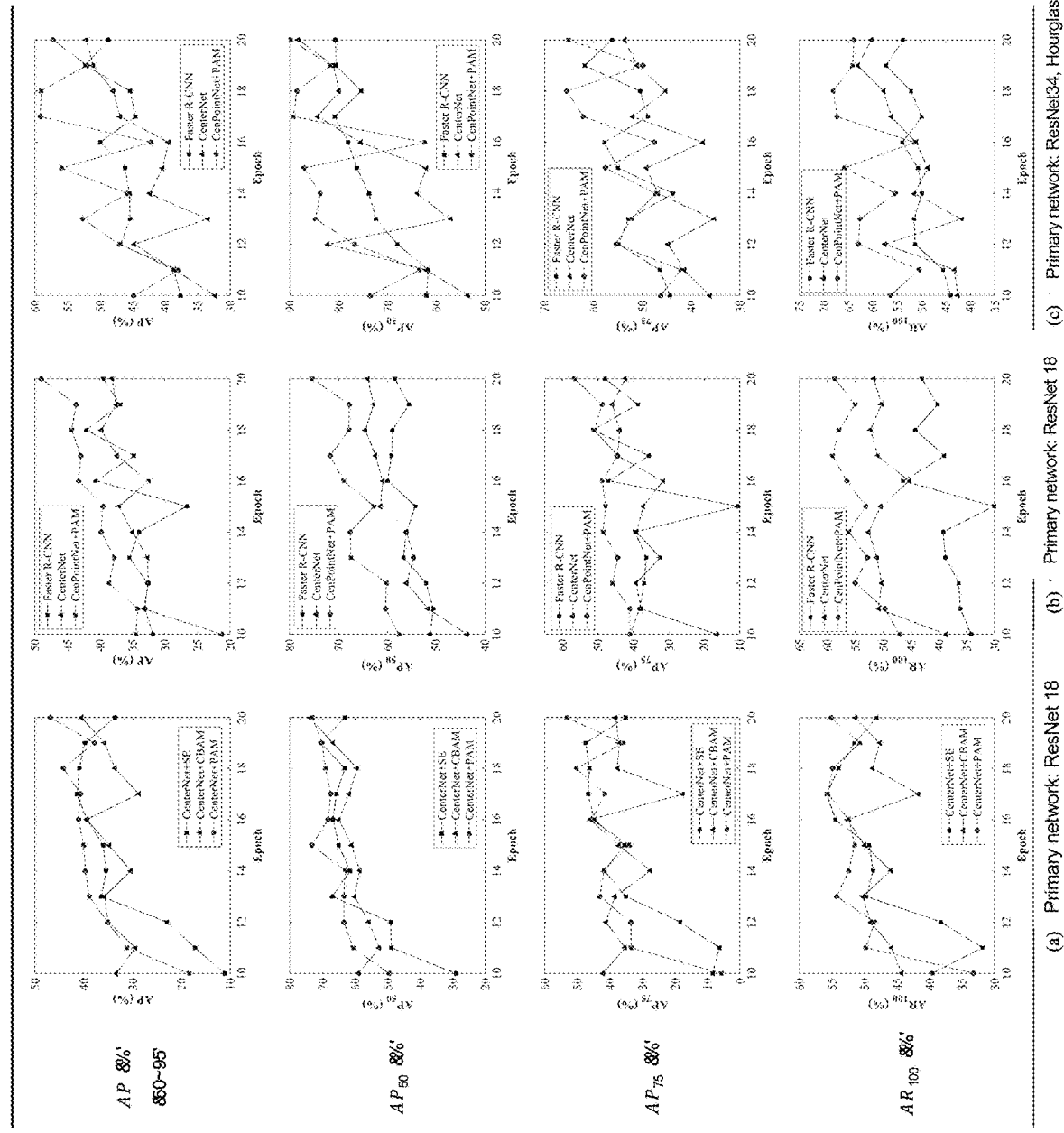
FIG. 12 is the algorithm framework by the present invention compared with a training process of other advanced target detection algorithms.

The comparison of prediction results between different methods is shown in FIG. 10 below, where the parameter quantity is the quantity of a constant deep learning model "volume". FPS (frame-per-second) represents the number of images processed by the algorithm in one second, which is the running speed of the algorithm. Compared with the Faster R-CNN method, the method proposed by the present invention is significantly better than the Faster R-CNN in the two dimensions of efficiency and accuracy. Compared with the 4 sub-versions of YOLO v5, YOLO v5s, YOLO v5m, YOLO v5l and YOLO v5x, we can see that the effect is not very ideal, and we are very shocked by the poor detection results of YOLOv5. Comparable performance can only be achieved by training the best YOLO v5 sub-version YOLO v5x for more Epochs. Although YOLO v5 is slightly faster in running speed, its accuracy is far inferior to the method proposed in this paper. Compared with the CenterNet method, the running speed is the same, but the detection effect is much higher than that of CenterNet. Two conclusions can be drawn from the comparison at the attention module level: (1) The PAM proposed by the present invention can achieve a general and substantial enhancement effect on different deep learning models under the premise of sacrificing a small amount of computation; (2) Compared with SENet and CBAM, PAM can obtain more enhancement, which is obviously better than SENet and CBAM.

The comparison of the training process between different methods is shown in FIG. 11, and the method proposed in the present invention is marked with a circle. It can be clearly seen that although the training results will oscillate to different degrees, our method can generally achieve higher AP and AR than traditional methods. That is, a better target detection effect can be obtained.

To sum up, the specific embodiment verifies the effectiveness of the technical solution of the present invention and the applicability to complex engineering. Compared with the traditional deep learning method, the proposed intelligent detection method is more suitable for multi-disease detection with variable slenderness ratio and complex shape. The proposed unmanned ship system also has high robustness and high practicability.

The above disclosure is only a typical embodiment of the present invention. However, the embodiment of the present invention is not limited thereto. After reading the patent by any person skilled in the art, the homogeneous modification of the patent should fall into the protection of the present invention scope.

The invention claimed is:

1. A method of using an intelligent detection system for detecting multiple types of faults for near-water bridges, comprising
providing the intelligent detection system, comprised of
a first component, an intelligent detection algorithm: CenWholeNet, an infrastructure fault target detection network based on deep learning, being electrically coupled to a second component;
the second component, an embedded parallel attention module PAM into the target detection network CenWholeNet, the parallel attention module includes two sub-modules: a spatial attention sub-module and a channel attention sub-module, being electrically coupled to a third component; and
the third component, an intelligent detection equipment assembly: an unmanned surface vehicle system based on lidar navigation, the unmanned surface vehicle includes four modules, a hull module, a video acquisition module, a lidar navigation module and a ground station module;
a computer readable storage medium, having stored thereon a computer program, said program arranged to:
Step 1: using a primary network to extract features of images;
Step 2: converting the extracted image features, by a detector, into tensor forms required for calculation, and optimizing a result through a loss function;
Step 3: outputting results includes converting the tensor forms into a boundary box and outputting of prediction results of target detection.

2. The method of claim 1, wherein
Step 1 of the infrastructure fault target detection network CenWholeNet in the first component having the primary network, the method of using the primary network is as follows:
giving an input image $P \in \mathbb{R}^{W \times H \times 3}$, wherein W is the width of the image, H is the height of the image, and 3 represents the number of channels of the image, that is, three RGB channels;
extracting features of the input image P through the primary network;
using two convolutional neural network models, Hourglass network and deep residual network ResNet.

3. The method of claim 1, wherein Step 2 of the infrastructure fault target detection network CenWholeNet in the first component having the detector, the method of using the detector is as follows:
converting the features extracted by the primary network into an output set consisting of 4 tensors $\widetilde{S} = [\tilde{H}, \tilde{D}, \tilde{O}, \widetilde{Polar}]$, by the detector, as a core of CenWholeNet;
using $$\tilde{H} \in [0,1]^{C \times \frac{W}{r} \times \frac{H}{r}}$$

represent a heat map of a central key point, where C is a category of the fault, which is taken as C=3 here, and r is an output step size, that is, the down sampling ratio, wherein a default step size is 4 and by down sampling, the calculation efficiency is improved;
defining $$H \in [0,1]^{C \times \frac{W}{r} \times \frac{H}{r}}$$

as a ground-truth heatmap, for category c, the ground-truth center point of location (i, j) is $p_{cij} \in \mathbb{R}^{C \times W \times H}$;
first, computing the ground-truth center point of location (i, j)'s down sampled equivalent position $$\hat{p}_{cxy} \in \mathbb{R}^{C \times \frac{W}{r} \times \frac{H}{r}},$$

wherein $$x = \left\lfloor \frac{i}{r} \right\rfloor, y = \left\lfloor \frac{j}{r} \right\rfloor;$$

then through a Gaussian kernel function, map $$\hat{p}_{cxy} \in \mathbb{R}^{C \times \frac{W}{r} \times \frac{H}{r}}$$

to tensor $$Y_p \in \mathbb{R}^{C \times \frac{W}{r} \times \frac{H}{r}} \ne 1$$

$Y_p$ is defined by:

$$Y_p(c, x, y) = \exp\left(-\frac{(x - \hat{p}_{cxy}(x))^2 + (y - \hat{p}_{cxy}(y))^2}{2\sigma_p^2}\right)$$

wherein $\hat{p}_{cxy}(x)$ and $\hat{p}_{cxy}(y)$ represent center point position (x,y),
$\sigma_p$=gaussian_radius/3; and gaussian_radius represent a maximum radius representing an offset of the corner points of a detection frame, wherein the maximum radius ensures that the intersection ratio between the offset detection frame and the ground-truth detection frame is IoU≥t, and t=0.7 is taken in all experiments; integrating all the corresponding $Y_p$ points to get the ground-truth heat map H:

$$H_{c,x,y} = \max_p [Y_p(c, x, r)], c \in [1, C], x \in \left[1, \frac{W}{r}\right], y \in \left[1, \frac{H}{r}\right]$$

wherein, $H_{c,x,y}$ represents a value of H at the position (c,x,y), a probability that this position is a center point; specifically, $H_{c,x,y}$=1 represents a central key point, a positive sample; conversely, $H_{c,x,y}$=0 is a background and the negative sample; focal loss as a metric to measure a distance between H and H̃, according to the following equation:

$$\mathcal{L}_{Heat} = -\frac{1}{N} \sum_{c=1}^{C} \sum_{x=1}^{W/r} \sum_{y=1}^{H/r} \begin{cases} (1 - \tilde{H}_{c,x,y})^\alpha \log(\tilde{H}_{c,x,y}) & \text{if } H_{c,x,y} = 1 \\ (\tilde{H}_{c,x,y})^\alpha \log(1 - \tilde{H}_{c,x,y})(1 - H_{c,x,y})^\beta & \text{Otherwise} \end{cases}$$

wherein N is a total count of all central key points, α and β are hyperparameters, configured to control the weights; in all cases, α=2, β=4; by minimizing $\mathcal{L}_{Heat}$, the neural network model is configured to better predict a position of a center point of the target;
obtaining a size information W×H of a prediction box to finally determine the boundary box;
defining a size of a ground-truth boundary box corresponding to the $k^{th}$ key point $p_k$ be $d_k=(w_k,h_k)$, and integrate all $d_k$ to get a ground-truth boundary box dimension tensor $$D \in \mathbb{R}^{2 \times \frac{W}{r} \times \frac{H}{r}}$$

$$D = d_1 \oplus d_2 \oplus \ldots \oplus d_N$$

wherein ⊕ represents pixel-level addition; for all fault categories, the model is configured to give a predicted dimension tensor $$\tilde{D} \in \mathbb{R}^{2 \times \frac{W}{r} \times \frac{H}{r}},$$

and L1 Loss is configured to measure D and D̃ similarity, determined by the following equation:

$$\mathcal{L}_D = \frac{1}{N} \sum_{k=1}^{N} \text{Smooth} L1\text{Loss}(\tilde{d}_k, d_k) = \frac{1}{N} \sum_{k=1}^{N} \begin{cases} 0.5\|\tilde{d}_k - d_k\|_2^2 & \text{if } \|\tilde{d}_k - d_k\|_1 < 1 \\ \|\tilde{d}_k - d_k\|_1 - 0.5 & \text{Otherwise} \end{cases}$$

obtaining a rough width and height of each prediction box by minimizing $\mathcal{L}_D$, by the model;
correcting an error caused by down sampling by introducing a position offset, because the image is scaled by r times; recording the coordinates of the $k^{th}$ key point $p_k$ as $(x_k, y_k)$, then the mapped coordinates are $$\left(\left\lfloor \frac{x_k}{r} \right\rfloor, \left\lfloor \frac{y_k}{r} \right\rfloor\right),$$

then get the ground-truth offset:

$$o_k = \left(\frac{x_k}{r} - \left\lfloor \frac{x_k}{r} \right\rfloor, \frac{y_k}{r} - \left\lfloor \frac{y_k}{r} \right\rfloor\right)$$

integrating all $o_k$ to get the ground-truth offset matrix $$O \in \mathbb{R}^{2 \times \frac{W}{r} \times \frac{H}{r}}; O = o_1 \oplus o_2 \oplus \ldots \oplus o_N$$

wherein, the 2 of a first dimension represents the offset of the key point (x, y) in the W and H directions; correspondingly, the model will give a prediction tensor $$\tilde{O} \in \mathbb{R}^{2 \times \frac{W}{r} \times \frac{H}{r}},$$

and smooth L1 Loss is used to train the offset loss:

$$\mathcal{L}_{Off} = \frac{1}{N} \sum_{k=1}^{N} \text{Smooth} L1\text{Loss}(\tilde{o}_k, o_k) = \frac{1}{N} \sum_{k=1}^{N} \begin{cases} 0.5\|\tilde{o}_k - o_k\|_2^2 & \text{if } \|\tilde{o}_k - o_k\|_1 < 1 \\ \|\tilde{o}_k - o_k\|_1 - 0.5 & \text{Otherwise} \end{cases}$$

introducing a new set of tensors to modify the prediction frame and improve the detection accuracy, in order to make the model pay more attention to the overall information of the target; specifically, taking an angle between a connecting line of diagonal points of the detection frame and the x-axis, and the diagonal length of the detection frame as the training targets; defining coordinates of an upper left corner and lower right corner of the detection frame to be $(x_k^1, y_k^1)$ and $(x_k^2, y_k^2)$, so the diagonal length of the detection frame $l_k$ is calculated as:

$$l_k = \sqrt{(x_k^1 - x_k^2)^2 + (y_k^1 - y_k^2)^2}$$

an inclination of the connecting line between the upper left and lower right corners $\theta_k$ is calculated by the following formula:

$$\theta_k = \pi - \arctan\left(\frac{y_k^2 - y_k^1}{x_k^2 - x_k^1}\right)$$

constructing a pair of complementary polar coordinates $$polar_k = \left(\frac{1}{2} l_k, \theta_k\right)$$

and further to obtain a ground-truth polar coordinate matrix $$Polar \in \mathbb{R}^{2 \times \frac{W}{r} \times \frac{H}{r}}:$$

$$Polar = \left(\frac{1}{2} l_1, \theta_1\right) \oplus \left(\frac{1}{2} l_2, \theta_2\right) \oplus \ldots \oplus \left(\frac{1}{2} l_N, \theta_N\right)$$

the model also gives a prediction tensor $$\widetilde{Polar} \in \mathbb{R}^{2 \times \frac{W}{r} \times \frac{H}{r}};$$

Polar and $\widetilde{Polar}$ is trained by a same L1 loss:

$$\mathcal{L}_{Polar} = \frac{1}{N} \sum_{k=1}^{N} \|\widetilde{polar}_k - polar_k\|_1$$

for each position, the model will predict the output of C+6, which will form the set $\tilde{S} = [\tilde{H}, \tilde{D}, \tilde{O}, \widetilde{Polar}]$, which will also share the weights of the network; and the loss function of is defined by:

$$\mathcal{L} = \mathcal{L}_{Heat} + \lambda_{Off} \mathcal{L}_{Off} + \lambda_D \mathcal{L}_D + \lambda_{Polar} \mathcal{L}_{Polar}$$

Wherein all the experiments, $\lambda_{Off} = 10$, $\lambda_D$ and $\lambda_{Polar}$ are both take as 0.1.

4. The method of claim 1, wherein Step 3 of the infrastructure fault target detection network CenWholeNet in the first component, the method of outputting result is as follows:

outputting results by extracting a possible center keypoint coordinates from a predicted heatmap tensor $\tilde{H}$, and then obtaining a predicted bounding box according to the information in the corresponding $\tilde{D}$, $\tilde{O}$ and $\widetilde{Polar}$; wherein the greater the value of $\tilde{H}_{c,x,y}$, the more likely it point $p_{cxy}$ is the center point; for category c, if the point $p_{cxy}$ satisfies the following formula, it is then $p_{cxy}$ is an candidate center point;

$$\tilde{H}_{c,x,y} = \max_{i^2 \leq 1, j^2 \leq 1, i,j \in \mathbb{Z}} [\tilde{H}_{c,x+i,y+j}]$$

wherein we do not need non-maximum suppression (NMS), using a 3×3 max-pooling convolutional layer to extract candidate center points; letting a set of center points $\tilde{P} = \{(\tilde{x}_k, \tilde{y}_k)\}_{k=1}^{N_p}$, wherein $N_p$ is a total number of selected center points; for any center points $(\tilde{x}_k, \tilde{y}_k)$, extract corresponding size information $(\tilde{w}_k, \tilde{h}_k) = (\tilde{D}_{1,\tilde{x}_k,\tilde{y}_k}, \tilde{D}_{2,\tilde{x}_k,\tilde{y}_k})$, offset information $(\delta \tilde{x}_k, \delta \tilde{y}_k) = (\tilde{O}_{1,\tilde{x}_k,\tilde{y}_k}, \tilde{O}_{2,\tilde{x}_k,\tilde{y}_k})$ and polar coordinate information $(\tilde{l}_k, \tilde{\theta}_k) = (\widetilde{Polar}_{1,\tilde{x}_k,\tilde{y}_k}, \widetilde{Polar}_{2,\tilde{x}_k,\tilde{y}_k})$; first, calculate the prediction frame size correction value according to $(\tilde{l}_k, \tilde{\theta}_k)$:

$$\begin{cases} \Delta \tilde{h}_k = \tilde{l}_k \sin(\tilde{\theta}_k) \\ \Delta \tilde{w}_k = -\tilde{l}_k \cos(\tilde{\theta}_k) \end{cases}$$

defining specific location of the prediction box as $$\begin{cases} Top = \tilde{y}_k + \delta \tilde{y}_k - \left(\alpha_y \cdot \frac{1}{2} \tilde{h}_k + \beta_y \cdot \Delta \tilde{h}_k\right); \\ Bottom = \tilde{y}_k + \delta \tilde{y}_k + \left(\alpha_k \cdot \frac{1}{2} \tilde{h}_k + \beta_y \cdot \Delta \tilde{h}_k\right) \\ Left = \tilde{x}_k + \delta \tilde{x}_k - \left(\alpha_x \cdot \frac{1}{2} \tilde{w}_k + \beta_x \cdot \Delta \tilde{w}_k\right); \\ Right = \tilde{x}_k + \delta \tilde{x}_k + \left(\alpha_x \cdot \frac{1}{2} \tilde{w}_k + \beta_k \cdot \Delta \tilde{w}_k\right) \end{cases}$$

wherein bounding box resizing hyperparameters as $\alpha_y = \alpha_x = 0.9$, $\beta_y = \beta_x = 0.1$.

5. The method of claim 1, wherein the method of establishing the parallel attention module in the second component is as follows:

providing a lightweight, plug-and-play parallel attention module PAM, configured to improves expressiveness of neural networks; wherein PAM considers two dimensions of feature map attention, spatial attention and channel attention force, and combine them in parallel;

giving an input feature map as $X \in \mathbb{R}^{C \times W \times H}$ wherein C, H and W denote channel, height and width, respectively; first, transforming $\mathcal{F}_1$ by implementing the spatial attention submodule: $X \rightarrow \tilde{U} \in \mathbb{R}^{C \times W \times H}$; then, transforming $\mathcal{F}_2$ by implementing the channel attention sub-module: $X \rightarrow \hat{U} \in \mathbb{R}^{C \times W \times H}$ finally, outputting feature map $U \in \mathbb{R}^{C \times W \times H}$; the transformations consists essentially of convolution, maximum pooling operation, mean pooling operation and ReLU function; and overall calculation process is as follows:

$$U = \tilde{U} \oplus \hat{U} = \mathcal{F}_1(X) \oplus \mathcal{F}_2(X)$$

wherein $\oplus$ represents output pixel-level tensor addition; wherein the spatial attention sub-module is configured to emphasize "where" to improve attention, and pay attention to the locations of regions of interest (ROIs); first, maximum pooling and mean pooling operations are performed on the feature map along a channel direction to obtain several two-dimensional images, $\lambda_1 U_{avg\_s} \in \mathbb{R}^{1 \times W \times H}$ and $\lambda_2 U_{max\_s} \in \mathbb{R}^{1 \times W \times H}$, wherein $\lambda_1$ and $\lambda_2$ are adjust hyperparameters for different pooling operation weights, and taking $\lambda_1 = 2$, $\lambda_2 = 1$; $U_{avg\_s}$ $\text{和}$ $U_{max\_s}$ are calculated by the following formulas, and MaxPool and AvgPool represent maximum pooling operation and the average pooling operation respectively;

$$U_{avg\_s}(1, i, j) = AvgPool(X) = \frac{1}{C}\sum_{k=1}^{C}X(k, i, j),$$

$$i \in [1, W], j \in [1, H]$$

$$U_{max\_s}(1, i, j) = \text{Max}Pool(X) = \max_{k\in[1,C]}(X(k, i, j)),$$

$$i \in [1, W], j \in [1, H]$$

next, introducing convolution operation to generate the spatial attention weight $U_{spa} \in \mathbb{R}^{1 \times W \times H}$; the overall calculation process of the spatial attention sub-module is as follows:

$$\mathcal{F}_1(X) = \hat{U} = U_{spa} \otimes X = \sigma(\text{Conv}([\lambda_1 U_{avg\_s}, \lambda_2 U_{max\_s}])) \otimes X$$

which is equivalent to:

$$\mathcal{F}_1(X) = \sigma(\text{Conv}([\text{MaxPool}(X), \text{AvgPool}(X), \text{AvgPool}(X)])) \otimes X$$

wherein, ⊗ represents pixel-level tensor multiplication, σ represents a sigmoid activation function, Conv represents a convolution operation, and a convolution kernel size is 3×3; and a spatial attention weight is copied along a channel axis;

the channel attention sub-module is configured to find the relationship of internal channels, and care about "what" is interesting in a given feature map; first, mean pooling and max pooling are performed along width and height directions to generate a number of 1-dimensional vector, $\lambda_3 U_{avg\_c} \in \mathbb{R}^{C \times 1 \times 1}$ 和 $\lambda_4 U_{max\_c} \in \mathbb{R}^{C \times 1 \times 1}$, and $\lambda_3$ and $\lambda_4$ are adjust hyperparameters for different pooling operation weights, and taking $\lambda_3$=2, $\lambda_4$=1; $U_{avg\_c}$ and $U_{max\_c}$ are calculated by the following formulas:

$$U_{avg\_c}(k, 1, 1) = AvgPool(X) = \frac{1}{W \times H}\sum_{i=1}^{W}\sum_{j=1}^{H}X(k, i, j), k \in [1, C]$$

$$U_{max\_c}(k, 1, 1) = \text{Max}Pool(X) = \max_{i\in[1,W], j\in[1,H]}(X(k, i, j)), k \in [1, C]$$

subsequently, introducing point-wise convolution (PConv) as a channel context aggregator to realize point-wise inter-channel interaction; in order to reduce amount of parameters, PConv is designed in a form of an Hourglass, and setting an attenuation ratio to r; finally, channel attention is obtained force weight $U_{cha} \in \mathbb{R}^{C \times 1 \times 1}$; the calculation process of this sub-module is as follows:

$$\mathcal{F}_2(X) = \hat{U} = U_{cha} \otimes X = \sigma\left(\sum PConv([\lambda_3 U_{avg\_c}, \lambda_4 U_{max\_c}])\right) \otimes X$$

which is equivalent to $$\mathcal{F}_2(X) = \sigma\left(\sum PConv2(\delta(PConv1([\lambda_3 U_{avg\_c}, \lambda_4 U_{max\_c}])))\right) \otimes X$$

δ represents the ReLU activation function; the size of the convolution kernel of PConv1 is C/r×C×1×1, and the size of the convolution kernel of the inverse transform PConv2 is C×C/r×1×1; selecting ratio r as 16, the channel attention weights is copied along the width and height directions;

wherein the PAM is a plug-and-play module, which ensures the strict consistency of the input tensor and output tensor at a dimension level; PAM is configured to be embedded in any position of any convolutional neural network model as a supplementary module, the method of providing PAM embedding Hourglass and ResNet including: for the ResNet network, the PAM is embedded in the residual block after the batch normalization layer, before the residual connection, and the same in each residual block; for the Hourglass network, the Hourglass network is divided into two parts: downsampling and upsampling and the downsampling part embeds the PAM between the residual blocks, as a transition module, the upsampling part embeds the PAM before the residual connection.

6. The method of claim 1, wherein the LIDAR-based unmanned surface vehicle of the third component comprises four modules including, the hull module, the video acquisition module, the lidar navigation module and ground station module, working together in a cooperative manner;

the hull module includes a trimaran and a power system; the trimaran is configured to be stable, resist level 6 wind and waves, and has an effective remote control distance of 500 meters, adaptable to engineering application scenarios; the size of the hull is 75×47×28 cm, which is convenient for transportation; an effective load of the surface vehicle is 5 kg, and configured to be installed with multiple scientific instruments; in addition, the unmanned surface vehicle has the function of constant speed cruise, which reduces the control burden of personnel;

the video acquisition module is composed of a three-axis camera pan/tilt, a fixed front camera and a fill light; the three-axis camera pan/tilt supports 10× optical zoom, auto focus, photography and 60 FPS video recording; said video acquisition module is configured to meet the needs of faults of different scales and locations shooting requirements; the fixed front camera is configured to determine a hull posture; a picture is transmitted back to a ground station in real time through a wireless image transmission device, on the one hand for fault identification, on the other hand for assisting a control of the USV; a controllable LED fill light board is installed to cope with small and medium-sized bridges and other low-light working environments, which contains 180 high-brightness LED lamp beads; 3D print a pan/tilt carrying the LED fill light board to meet the needs of multi-angle fill light; in addition, a fixed front-view LED light is also installed beads, providing light source support for the front-view camera;

the lidar navigation module includes lidar, mini computer, a set of transmission system and control system; lidar is configured to perform 360° omnidirectional scanning; after the lidar is connected with the mini computer, the lidar can perform real-time mapping of the surrounding environment of the unmanned surface vehicle; through wireless image transmission, the information of the surrounding scene is transmitted back to the ground station in real time, so as to realize the lidar navigation of the unmanned surface vehicle; based on the lidar navigation, the unmanned surface vehicle no longer needs GPS positioning, in areas with weak GPS signals such as under the bridges and underground culverts; the wireless transmission system supports real-time transmission of 1080P video, with a maximum transmission distance of 10 kilometers; redundant transmission is used to ensure link stability and strong anti-interference; the control system consists of wireless image transmission equipment, Pixhawk 2.4.8 flight control and SKYDROID T12 receiver, and through the flight control and receiver, the control system effectively control the equipment on board;

the ground station module includes two remote controls and multiple display devices; a main remote control is used to control the unmanned surface vehicle, and a secondary remote control is used to control the surface vehicle borne scientific instruments, and the display device is used to monitor the real-time information returned by the camera and lidar; the display device displays the picture in real time; the devices cooperate with each other to realize the intelligent fault detection without a GPS signal.

* * * * *